United States Patent
Jo et al.

(10) Patent No.: US 12,331,957 B2
(45) Date of Patent: Jun. 17, 2025

(54) AIR PURIFIER AND CONTROLLING METHOD THEREOF

(71) Applicant: SAMSUNG ELECTRONICS CO., LTD., Suwon-si (KR)

(72) Inventors: Sejin Jo, Suwon-si (KR); Kwangyoun Kim, Suwon-si (KR); Pyeongki Park, Suwon-si (KR); Sejin Sohn, Suwon-si (KR); Kwangil Ryu, Suwon-si (KR); Jinseob Jeon, Suwon-si (KR); Jonghun Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 662 days.

(21) Appl. No.: 17/575,763

(22) Filed: Jan. 14, 2022

(65) Prior Publication Data
US 2022/0299220 A1    Sep. 22, 2022

Related U.S. Application Data

(63) Continuation of application No. PCT/KR2021/019551, filed on Dec. 22, 2021.

(51) Int. Cl.
*F24F 8/10*    (2021.01)
*H02S 20/32*    (2014.01)
(Continued)

(52) U.S. Cl.
CPC ............... *F24F 8/10* (2021.01); *H02S 20/32* (2014.12); *H02S 40/38* (2014.12); *F24F 2005/0067* (2013.01); *F24F 2130/20* (2018.01)

(58) Field of Classification Search
CPC .... F24F 8/10; F24F 5/00; F24F 5/0046; F24F 2005/0064; F24F 2005/0067;
(Continued)

(56) References Cited

U.S. PATENT DOCUMENTS 9,825,583 B1 * 11/2017 Riley ..................... H02S 40/38
10,704,536 B2    7/2020 Hwang et al.
(Continued)

FOREIGN PATENT DOCUMENTS

CN    107747781    3/2018
JP    2745834    4/1998
(Continued)

OTHER PUBLICATIONS

International Search Report dated Apr. 22, 2022 from International Application No. PCT/KR2021/019551.

*Primary Examiner* — Avinash A Savani
*Assistant Examiner* — Ryan L Faulkner
(74) *Attorney, Agent, or Firm* — STAAS & HALSEY LLP

(57) ABSTRACT

An air purifier may include a main body including an inlet and an outlet; a fan arranged in the main body; a solar cell arranged on a first side of the main body; a first light sensor arranged on a second side, which is different from the first side; a second light sensor arranged on a third side, which is different from the first and second sides; a driver arranged to rotate the main body; and a controller configured to control the fan to suck air into the main body through the inlet and discharge the air out of the main body through the outlet, and control the driver to rotate the main body based on an output signal from the first light sensor and an output signal from the second light sensor.

3 Claims, 26 Drawing Sheets

(51) Int. Cl.
*H02S 40/38* (2014.01)
*F24F 5/00* (2006.01)
*F24F 130/20* (2018.01)

(58) Field of Classification Search
CPC ... F24F 2130/20; F24F 2130/30; H02S 20/32; H02S 40/38
USPC .................................................. 454/229, 900
See application file for complete search history.

(56) References Cited

U.S. PATENT DOCUMENTS

| | | | |
|---|---|---|---|
| 2004/0176021 A1* | 9/2004 | Mills | B60H 1/00792 |
| | | | 454/143 |
| 2018/0224139 A1* | 8/2018 | Watkins | F24F 11/77 |
| 2019/0120508 A1* | 4/2019 | Goswami | F24F 8/80 |

FOREIGN PATENT DOCUMENTS

| | | |
|---|---|---|
| JP | 11-309386 | 11/1999 |
| KR | 10-1141896 | 5/2012 |
| KR | 10-1549770 B1 | 9/2015 |
| KR | 10-2050364 B1 | 12/2019 |
| KR | 10-2095435 B1 | 3/2020 |
| KR | 10-2020-0085511 | 7/2020 |
| KR | 10-2020-0097409 | 8/2020 |
| KR | 10-2211411 | 2/2021 |
| KR | 20-0493278 | 3/2021 |

* cited by examiner

FIG. 1
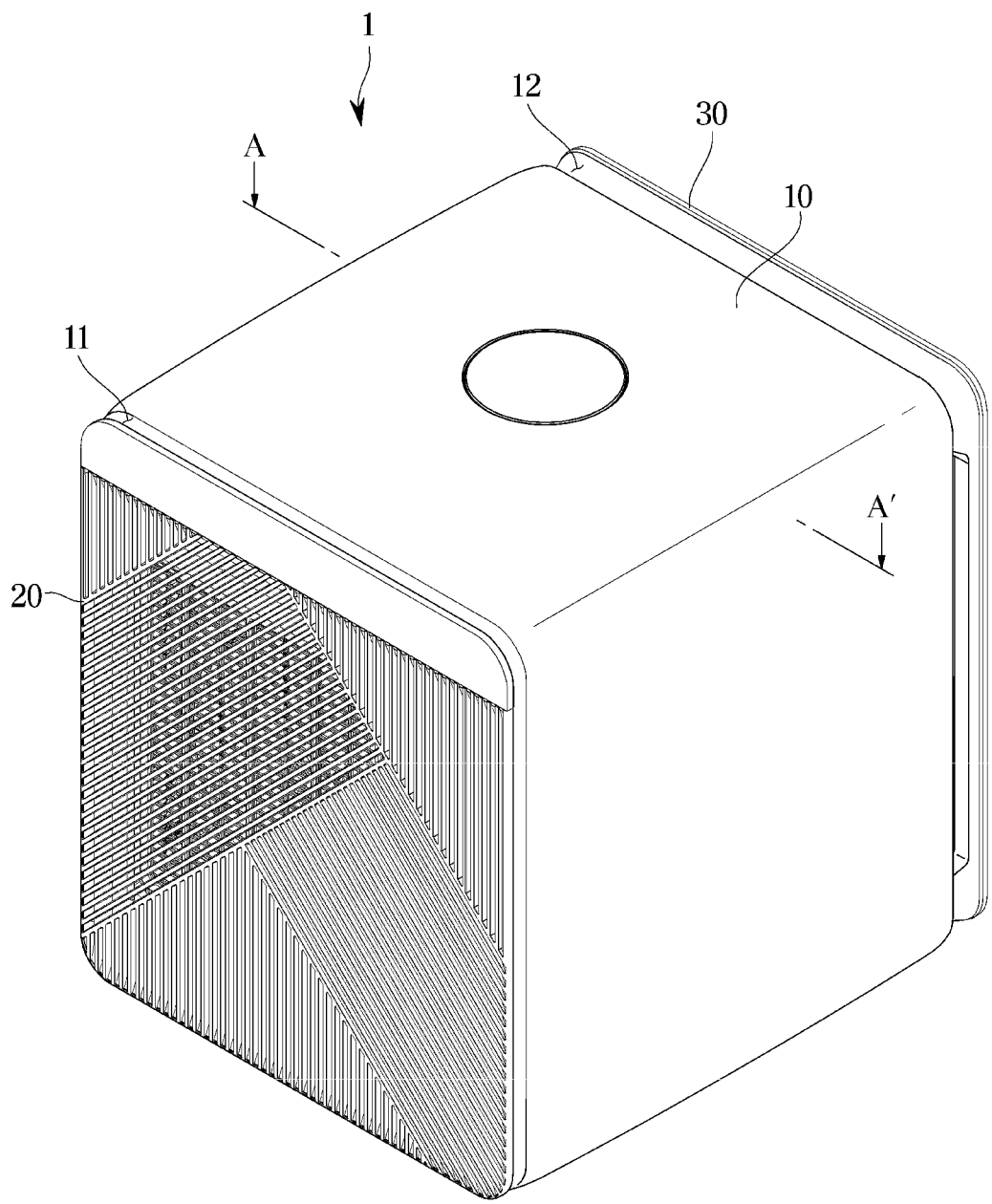
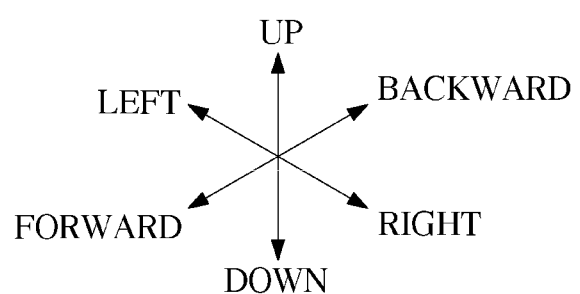

FIG. 4
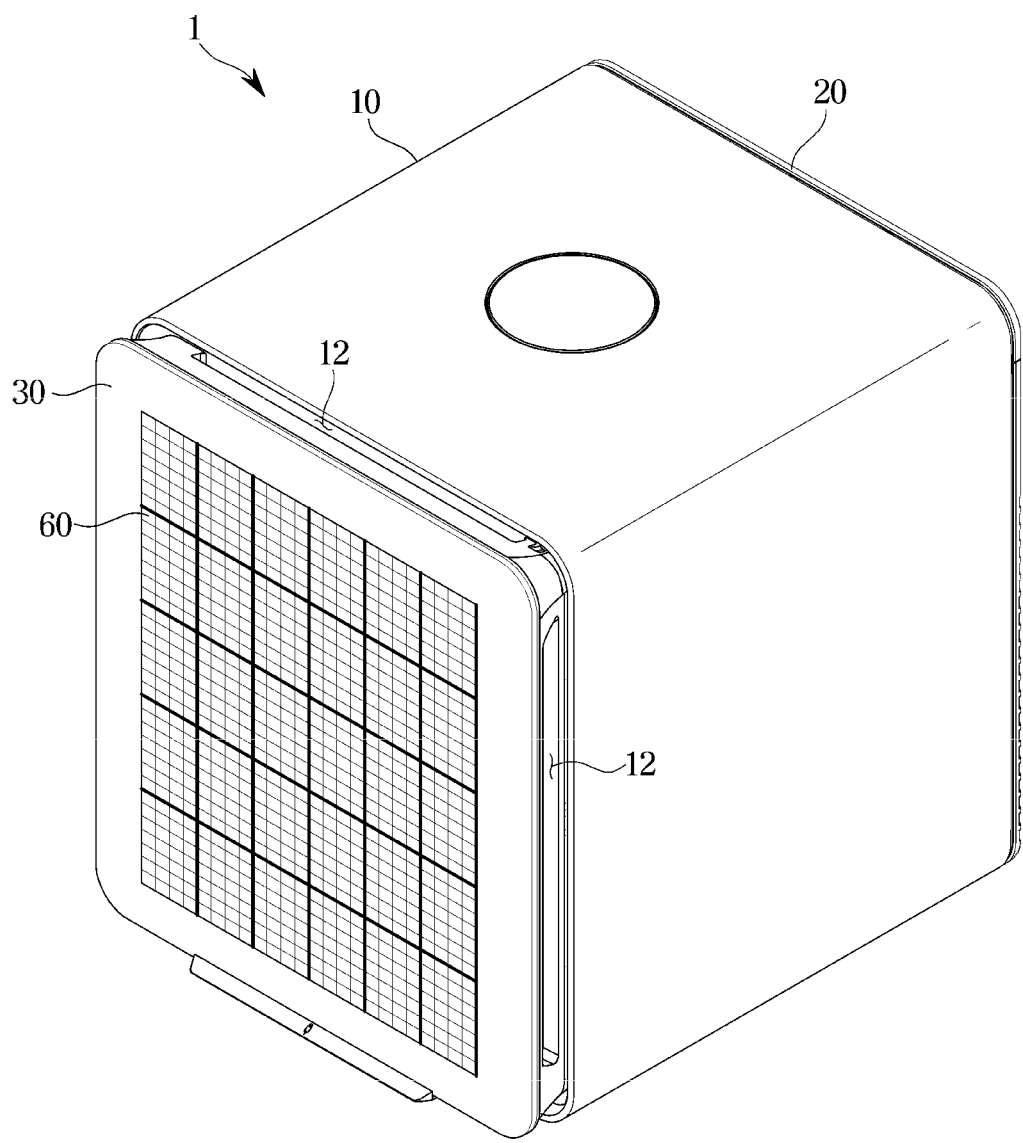
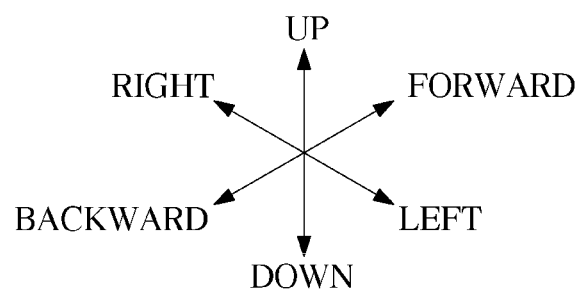

AIR PURIFIER AND CONTROLLING METHOD THEREOF

CROSS-REFERENCE TO RELATED APPLICATION

This application is a bypass continuation application of International Application No. PCT/KR2021/019551 filed on Dec. 22, 2021, which claims priority under 35 U. S. C. § 119 from Korean Patent Application No. 10-2021-0034229 filed on Mar. 16, 2021, the disclosures of which is incorporated herein by reference in its entirety.

BACKGROUND

1. Field

The disclosure relates to an air purifier and method of controlling the same, and more particularly, to an air purifier including a solar cell and method for controlling the same.

2. Background

Air purifiers are devices for sucking up indoor air, purifying and discharging the air. Air purification refers to proper control over the indoor air.

The air purifier may control the cleanliness of the indoor air by removing contaminants in the air. The air purifier may remove germs, viruses, mold, fine dust, and chemicals which cause offensive odor in the air sucked up.

The air purifier may include a filter for purifying contaminated indoor air. The air sucked into the air purifier may be purified into clean air with the contaminants removed while passing through the filter, and the purified air may be discharged out of the air purifier.

For purifying operation of the air purifier, there is a need to measure the contamination level of space to be purified. To measure the contamination level of the space to be purified, the air purifier may include a particle sensor that emits a laser beam to particles contained in the air and then measures the contamination level based on an amount of beams scattered by the particles.

The air purifier needs to be constantly activated to control the cleanliness of the space to be purified. Hence, the air purifier may consume a lot of power.

SUMMARY

The disclosure provides an air purifier including a solar cell and a battery, and a method of controlling the air purifier.

The disclosure also provides an air purifier with a solar cell rotationally movable toward the sun, and a method of controlling the air purifier.

The disclosure also provides an air purifier for receiving power from one of a battery and an external power source based on a charge rate of the battery, and a method of controlling the air purifier.

According to an aspect of the disclosure, an air purifier includes a main body configured to be rotatable and including an inlet and an outlet; a fan arranged in the main body; a solar cell arranged on a first side of the main body, the first side extending along a first plane; a first light sensor arranged on a second side of the main body and configured to measure an intensity of light received by the first sensor, the second side extending along a second plane, the first plane and the second plane being different from each other; a second light sensor configured to measure an intensity of light received by the second light sensor, the second light sensor arranged on a third side of the main body, the third side extending along a third plane, the third plane being different from the first plane and second plane; a driver arranged to rotate the main body; and a processor configured to control the fan to suck air into the main body through the inlet and discharge the air out of the main body through the outlet, and control the driver to rotate the main body based on an output signal from the first light sensor corresponding to the measured intensity of light received by the first light sensor and an output signal from the second light sensor corresponding to the measured intensity of light received by the second light sensor so that the solar cell is positioned toward a light source.

According to an aspect of the disclosure, a method of controlling an air purifier includes sucking air into a main body through an input arranged at the main body; discharging air out of the main body through an outlet arranged at the main body; generating power using a solar cell arranged on a first side of the main body, the first side extending along a first plane; and rotating the main body so that the solar cell is positioned toward a light source, based on an output signal of a first light sensor, the output signal corresponding to an intensity of light received by the first light sensor, the first light sensor arranged on a second side of the main body, the second side extending along a second plane, the first plane being different from the second plane and an output signal of a second light sensor, the output signal of the second light sensor corresponding to an intensity of light received by the second light sensor, the second light sensor arranged on a third side of the main body, the third side extending along a third plane, the third plane being different from the first plane and second plane.

According to an aspect of the disclosure, an air purifier includes a main body including an inlet and an outlet; a fan arranged in the main body; a contamination sensor configured to detect a density of contaminants in the air; a solar cell arranged on a first side of the main body; a battery electrically connected to the solar cell; an adapter configured to receive power from an external power source; a power circuit configured to supply power to the fan from one of the battery and the adapter; and a controller configured to control the fan to suck air into the main body through the inlet and discharge the air out of the main body through the outlet. The controller may control the power circuit to provide power to the fan from the external power source based on a density of the contaminants based on an output signal from the contamination sensor being larger than a reference density and a charge rate of the battery being less than a reference charge rate.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 1 illustrates an external appearance of an air purifier, according to an embodiment.

FIG. 4 illustrates a solar cell arranged on the rear side of an air purifier, according to an embodiment.

DETAILED DESCRIPTION OF EXEMPLARY EMBODIMENTS

Figure 2:
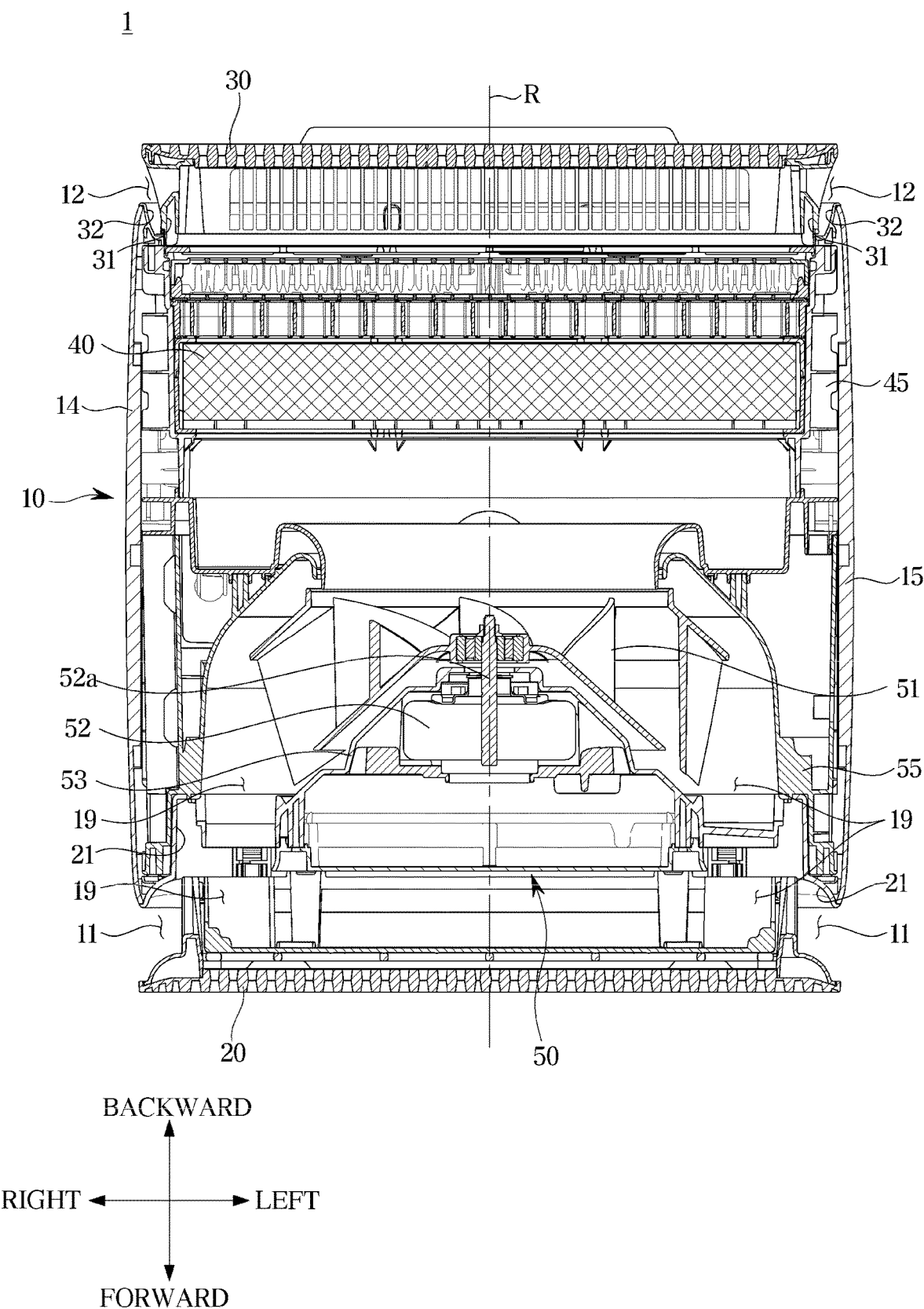
FIG. 2 illustrates a cross-section A-A' shown in FIG. 1.

Like numerals may refer to like elements throughout the specification.

Not all elements of embodiments of the disclosure will be described, and description of what are commonly known in the art or what overlap each other in the embodiments will be omitted.

The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

Throughout the specification, the term "include (or including)" or "comprise (or comprising)" is inclusive or open-ended and does not exclude additional, unrecited components, elements or method steps, unless otherwise stated.

Throughout the specification, when it is said that a member is located "on" another member, it implies not only that the member is located adjacent to the other member but also that a third member exists between the two members. The terms "front", "top or upper", "bottom or lower", "left" and "right" as herein used are defined with respect to the drawings, but the terms may not restrict the shape and position of the respective components.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Throughout the specification, it is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the disclosure will now be described with reference to accompanying drawings.

Figure 3:
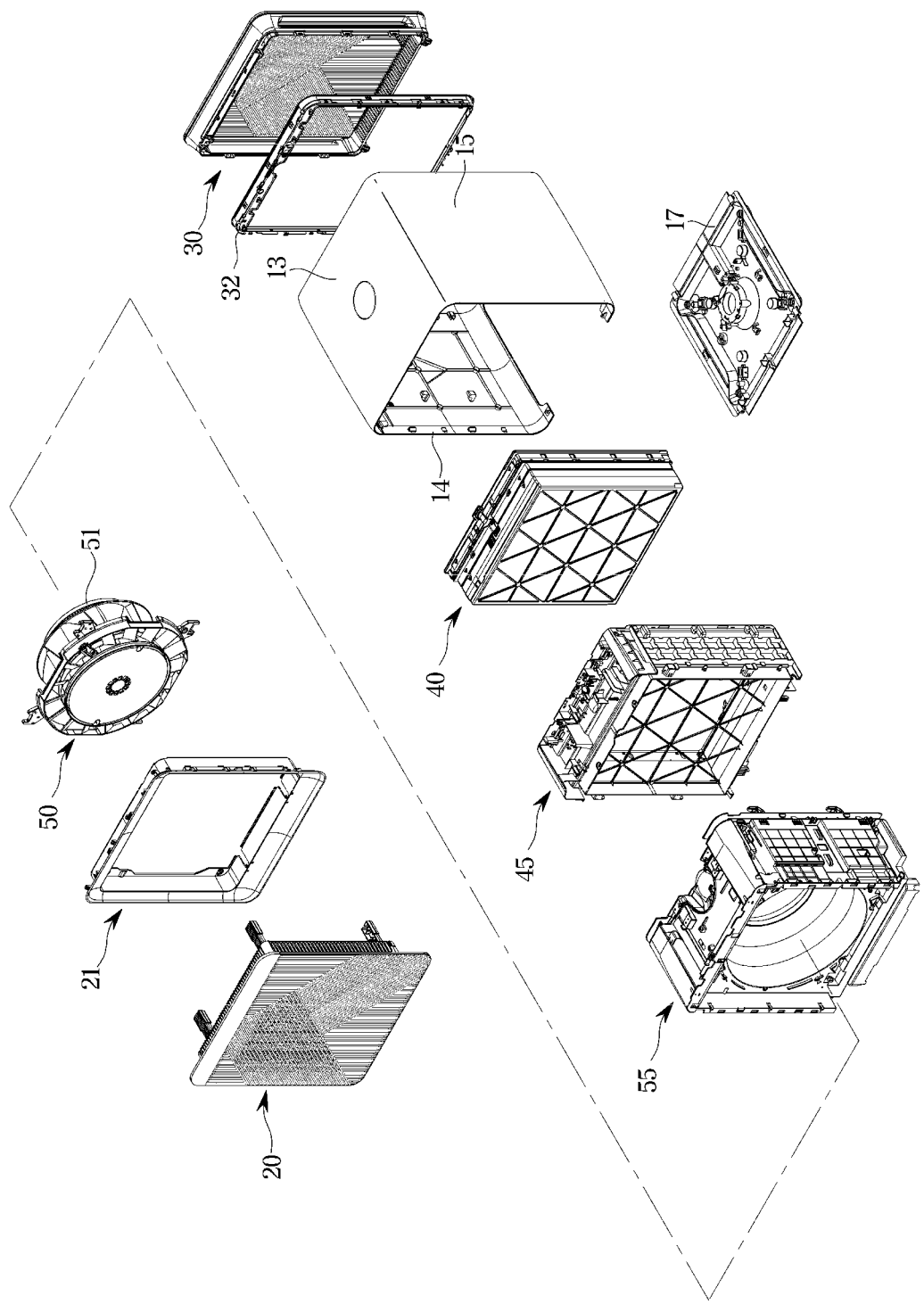
FIG. 3 is an exploded view of the air purifier of FIG. 1 according to the embodiment.

FIG. 1 illustrates external appearance of an air purifier, according to an embodiment. FIG. 2 illustrates a cross-section A-A' shown in FIG. 1. FIG. 3 is an exploded view of the air purifier of FIG. 1 according to the embodiment.

Referring to FIGS. 1, 2 and 3, an air purifier 1 may include a main body 10 provided in the form of a rectangular parallelepiped or a cube. The main body 10 is not, however, limited to the rectangular parallelepiped or the cube form, and may be provided in various forms such as a polyhedron, a cylinder, etc.

The main body 10 may include a cabinet that forms an external appearance. The cabinet may include a cabinet top side 13, a cabinet left side 14, a cabinet right side 15, and a cabinet bottom side 17. The cabinet top side 13, the cabinet left side 14, and the cabinet right side 15 may be integrally formed. The cabinet top side 13, the cabinet left side 14, the cabinet right side 15, and the cabinet bottom side 17 may define top, left, right, and bottom of the main body 10, respectively.

The main body 10 may further include a front panel 20 with its front edges arranged to be opened, and a rear panel 30 with its rear edges arranged to be opened.

The air purifier 1 may include an inlet 12 formed at the main body 10 to bring in outside air distributed outside to the inside of the air purifier 1, specifically, to the inside of the main body 10. The air purifier 1 may include an outlet 11 formed at the main body 10 to discharge the air brought in through the inlet 12.

The inlet 12 and the outlet 11 may be formed at different sides or at the same side of the main body 10. For example, as shown in FIG. 1, the inlet 12 may be formed on the rear side of the main bod 10, and the outlet 11 may be formed on the front side of the main body 10. Specifically, the inlet 12 may be arranged to surround the rear panel 30, and the outlet 11 may be arranged to surround the front panel 20.

The air purifier 1 may include a filter unit 40 or fan assembly 50 arranged in the main body 10.

The fan assembly 50 may suck up air outside the air purifier 1 through the inlet 12 to the inside of the main body 10 to force the air to pass through the filter unit 40. The fan assembly 50 may discharge the air filtered by the filter unit 40 out of the main body 10 through the outlet 11.

The air purifier 1 may further include a fan case 55 for containing and fixing the fan assembly 50 thereto. The fan case 55 may form a wind-blow fluid path 19 to guide an airflow created by the fan assembly 50 to the outlet 11 arranged in front of the fan case 55.

The wind-blow fluid path 19 may be defined as a fluid path in which air moved by the fan assembly 50 flows from the inlet 12 of the air purifier 1 to the outlet 11 of the air purifier 1.

The fan assembly 50 may include fan wings 51 that create an airflow inside the main body 10, a first motor 52 for rotating the fan wings 51, and a motor cover 53 that receives and fixes the first motor 52 thereto.

The first motor 52 may include a shaft 52a, which may be coupled to the fan wings 51 to transfer power of the first motor 52 to the fan wings 51. The shaft 52a may extend in a forward or backward direction. The first motor 52 may receive power from a driving circuit and rotate in response to the received power.

The fan wings 51 may have a rotation axis R in parallel with the forward or backward direction. The fan wings 51 may include a mixed flow fan. The fan wings 51 may include a turbo fan. The fan wings 51 may suck in air from behind, and discharge the air forward. The fan wings 51 may be covered by the fan case 55.

The motor cover 53 may support the fan wings 51 so that the fan wings 51 are arranged in the fan case 55. Specifically, as the motor cover 53, to which the first motor 52 coupled with the fan wings 51 is fixed, is fastened to the fan case 55, the fan wings 51 may be supported by the motor cover 53. The motor cover 53 may include a cover bracket coupled to the fan case 55.

The filter unit 40 may purify the air sucked in from the inlet 12, and may be detachably installed in the main body 10.

The air purifier 1 may further include a filter case 45 in which the filter unit 40 may be mounted. The filter case 45 may be arranged behind the fan case 55. The filter case 45 and the fan case 55 may be covered by the cabinet.

The air purifier 1 may include the font panel 20 provided to be movable relative to the main body 10 to adjust the size of the outlet 11. The front panel 20 may be arranged in front of the main body 10. The front panel 20 may form e.g., the front of the external appearance of the air purifier 1.

The outlet 11 may be formed between the front panel 20 and the cabinet of the main body 10. For example, the outlet 11 may be defined as a gap formed between the front panel 20 and the cabinet of the main body 10 when the front panel 20 moves forward. The front panel 20 may increase the size of the outlet 11 by moving forward. The front panel 20 may reduce the size of the outlet 11 by moving backward again from a state of being moved forward by a certain length.

However, it is not limited thereto. The front panel 20 may be fixed not to be moved in front of the main body 10, and the outlet 11 may be formed at the front panel 20 or the main body 10. The front panel 20 may be integrally formed with the main body 10.

The air purifier 1 may further include a guard frame 21 arranged between the front panel 20 and the main body 10.

The guard frame 21 may be arranged to be spaced out from the outer edges of the front panel 20. The guard frame 21 may have a shape corresponding to the front panel 20.

The guard frame 21 may be provided in the form that surrounds at least some of the outer edges of the front panel 20.

The guard frame 21 may be arranged between the front panel 20 and the main body 10 to fix the front panel 20 to the main body 10. For example, the front panel 20, the guard frame 21 and the main body 10 may be fastened to each other through a structure with hooks and corresponding grooves. The fastening structure is not limited to the hook-groove structure, and there may be various structures such as screw-fastening.

The rear panel 30 may form the external appearance of the main body 10. The rear panel 30 may form e.g., the rear side of the external appearance of the air purifier 1.

The rear panel 30 may be spaced out from the cabinet of the main body 10. The inlet 12 may be formed between the rear panel 30 and the cabinet of the main body 10. For example, the inlet 12 may be defined as a gap formed between the rear panel 30 and the cabinet of the main body 10.

The rear panel 30 may further include a guide flange 31 formed along the edges of the rear panel 30. The guide flange 31 may protrude toward the main body 10 from the edges of the rear panel 30. The rear panel 30 may be coupled to the main body 10 through a fastening structure formed at the guide flange 31. The guide flange 31 may be provided in the form of substantially a loop.

The air purifier 1 may further include a guard flange 32 arranged between the rear panel 30 and the main body 10. The guard flange 32 may be arranged to be spaced out from the outer edges of the guide flange 31. The guard flange 32 may be provided in a form corresponding to the guide flange 31. The guard flange 32 may have a form that surrounds at least some of the outer edges of the guide flange 31.

The guard flange 32 may be arranged between the rear panel 30 and the main body 10 to fix the rear panel, specifically, the guide flange 31 to the main body 10. For example, the rear panel 30, the guard flange 32 and the main body 10 may be fastened to each other through a structure with hooks and corresponding grooves. The fastening structure is not limited to the hook-groove structure, and there may be various structures such as screw-fastening.

FIG. 4 illustrates an air purifier with a solar cell arranged on the rear side, according to an embodiment.

The air purifier 1 may further include a solar cell 60 that is capable of generating power from the light.

The solar cell 60 may refer to a device capable of converting solar energy to electric energy. For example, when light having energy greater than in a forbidden bandwidth of the semiconductor is irradiated to a PN junction where the P-type semiconductor and the N-type semiconductor join, an electron and a hole may be produced at the PN junction. In this case, according to an electric field produced at the PN junction, the electron may move to the N-type semiconductor and the hole may move to the P-type semiconductor. With the electron moving to the N-type semiconductor and the hole moving to the P-type semiconductor, electromotive force may be generated across the semiconductor. In this case, the semiconductor may include silicon (Si), gallium arsenide (GaAs), cadmium sulfide (CdS), indium phosphorus (InP), or the like.

The air purifier 1 may further include a battery capable of storing power produced by the solar cell 60, and a charging circuit for charging the battery using the power produced by the solar cell 60.

The battery may include a pair of electrodes, and an electrolyte between the pair of electrodes. The battery may convert electric energy to chemical energy based on a voltage applied to the pair of electrodes and store the chemical energy. Furthermore, the battery may convert chemical energy to electric energy based on a voltage applied to the pair of electrodes and store the electric energy.

For example, the battery may store electric energy produced by the solar cell 60 or electric energy received from an external power source. Moreover, the battery may provide the electric energy to the air purifier 1.

The solar cell 60 and the battery may be arranged in various positions at the air purifier 1.

The solar cell 60 and the battery may be arranged at the rear panel 30 of the air purifier 1, as shown in FIG. 4. In other words, the solar cell 60 may be installed on the rear side of the air purifier 1.

The user may usually place the air purifier 1 so that the outlet 11 of the air purifier 1 faces the inner side of an indoor space and the inlet 12 faces the outer side of the indoor space. Accordingly, the outlet 11 of the air purifier 1 may face the center of the indoor space and the inlet 12 may face a wall or a window of the indoor space.

For example, when the air purifier 1 is placed near a window, the front panel 20 of the air purifier 1 may face the center of the indoor space and the rear panel 30 may face the window of the indoor space. Hence, the light may enter the rear panel 30. Accordingly, a constant solar ray may be incident on the solar cell 60 installed on the rear panel 30, and the solar cell 60 may constantly produce power during the daytime.

Furthermore, as the inlet 12 is formed to surround the rear panel 30, the inlet 112 may not be blocked or interfered by the solar cell 60 even though the solar cell 60 is arranged on the rear panel 30.

In this way, the solar cell 60 installed at the rear panel 30 on the rear side of the air purifier 1 may not block or interferer an airflow from the air purifier 1, and may constantly produce power during the daytime.

The position in which the solar cell 60 is installed is not, however, limited to the rear panel 30. For example, the solar cell 60 may be detachably attached to the top side of the air purifier 1.

Figure 5:
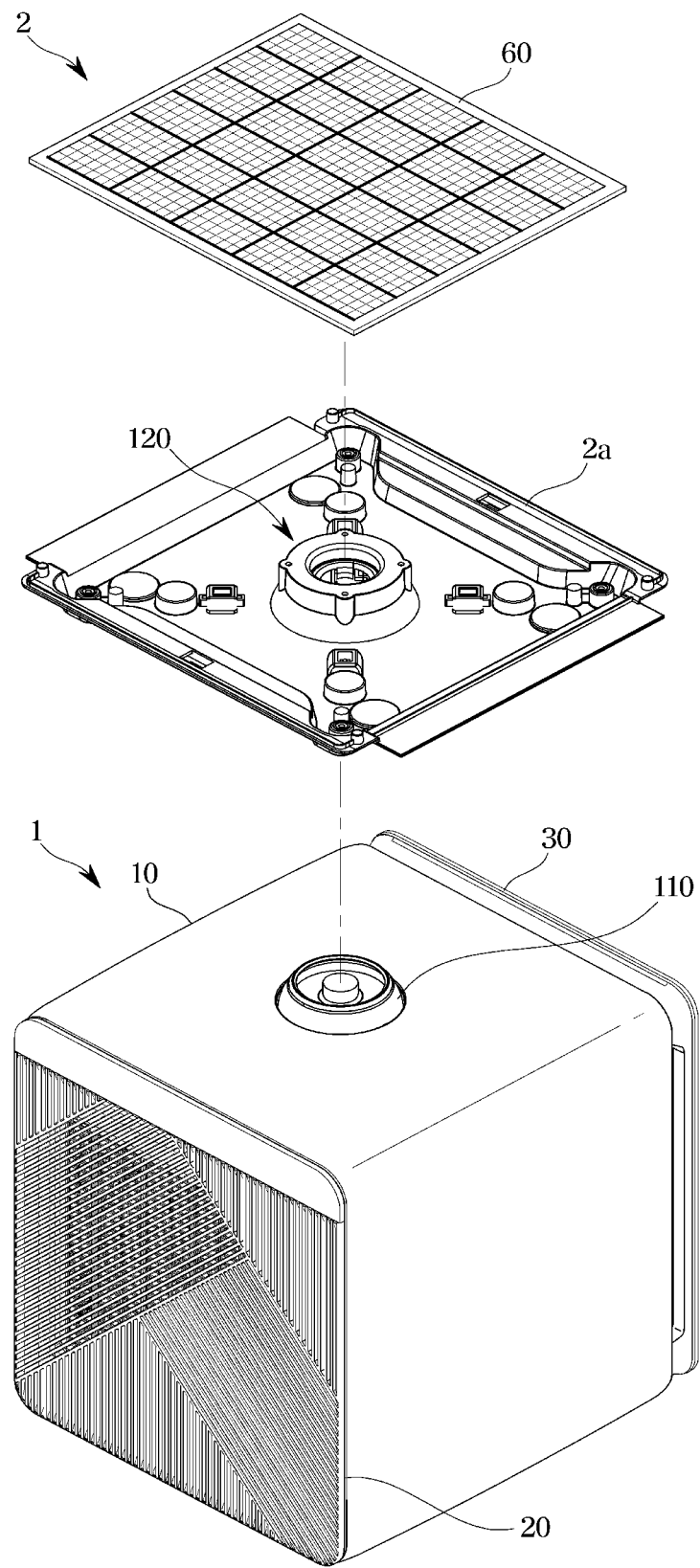
FIG. 5 illustrates detachment of a solar panel from the top side of an air purifier, according to an embodiment.
Figure 6:
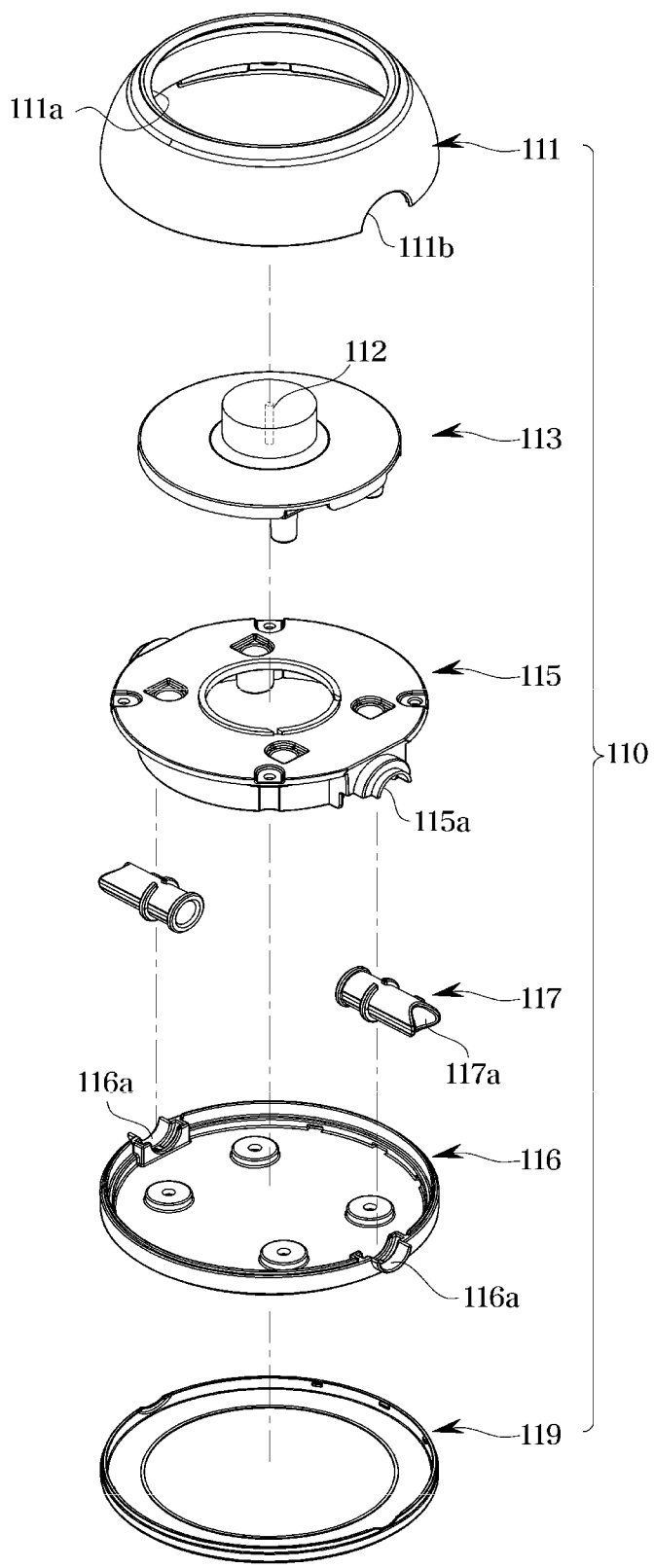
FIG. 6 is an exploded view of a first connector to be installed on the top side of an air purifier, according to an embodiment.
Figure 7:
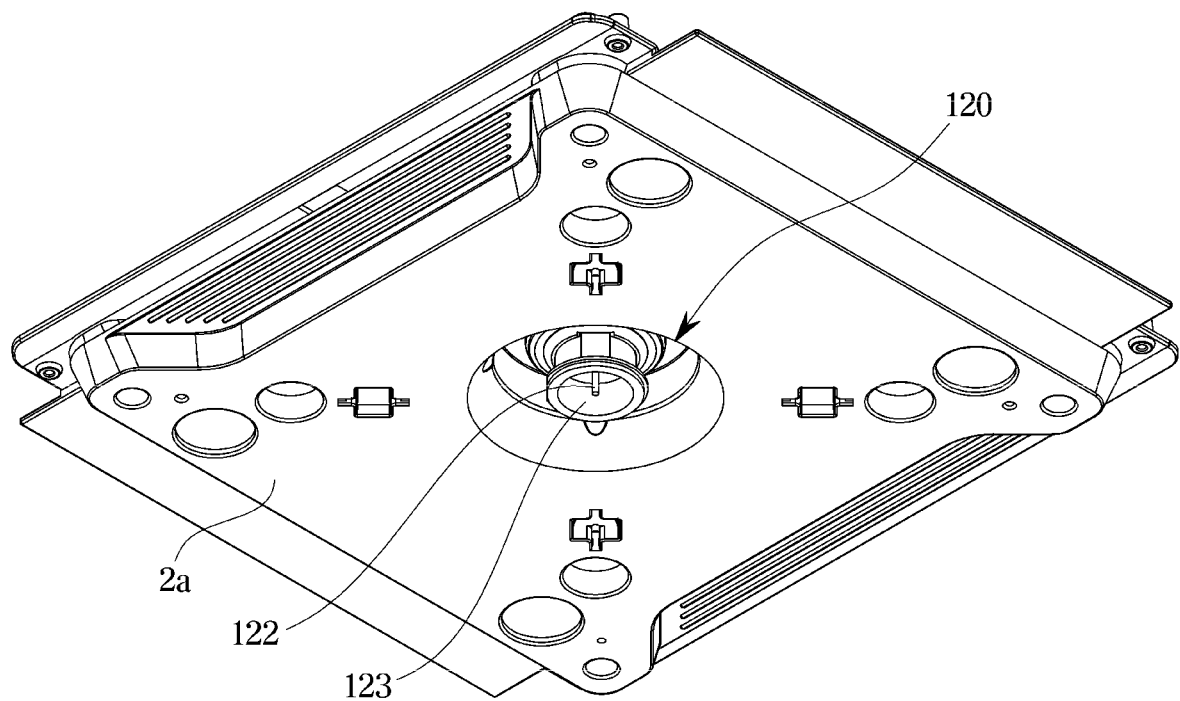
FIG. 7 illustrates a lower cover of a solar panel to be coupled to an air purifier, according to an embodiment.
Figure 8:
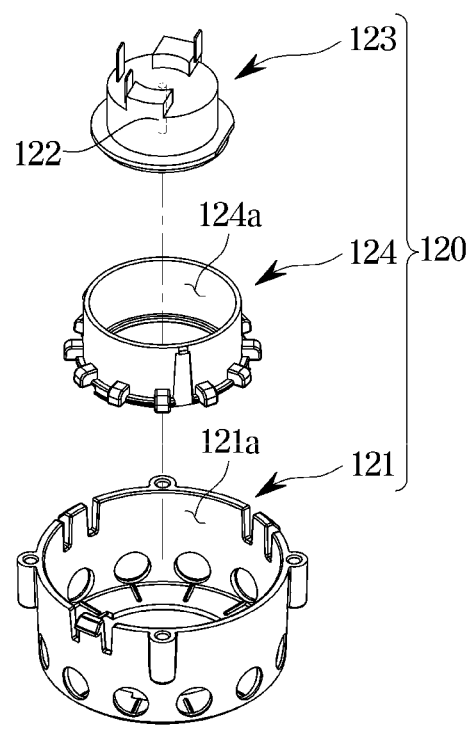
FIG. 8 is an exploded view of a second connector to be installed on a lower cover of a solar panel coupled to an air purifier, according to an embodiment.
Figure 9:
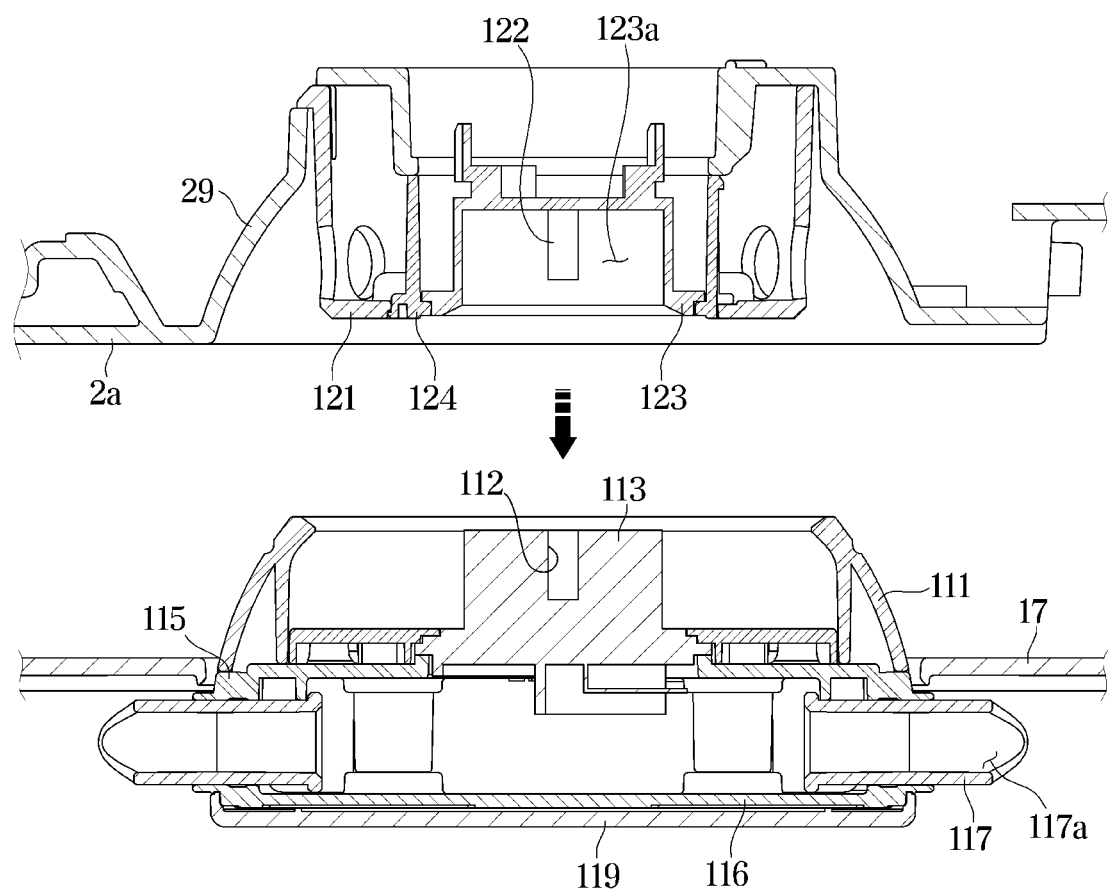
FIG. 9 illustrates coupling of a first connector of an air purifier with a second connector of a solar panel, according to another embodiment of the disclosure.

FIG. 5 illustrates detachment of a solar panel from the top side of an air purifier, according to an embodiment. FIG. 6 is an exploded view of a first connector to be installed on the top side of an air purifier, according to an embodiment. FIG. 7 illustrates a lower cover of a solar panel to be coupled to an air purifier, according to an embodiment. FIG. 8 is an exploded view of a second connector to be installed on a lower cover of a solar panel coupled to an air purifier, according to an embodiment. FIG. 9 illustrates coupling of a first connector of an air purifier with a second connector of a solar panel, according to another embodiment of the disclosure.

As shown in FIG. 5, a solar panel 2 may be detachably attached to the top side of the air purifier 1.

A first connector 110 may be arranged on the top side of the air purifier 1 to mechanically and electrically couple the air purifier 1 to the solar panel 2.

The first connector 110 may be coupled to be rotatable relative to the main body 10 around a rotation axis 114 that is parallel to the top side of the main body 10. To couple the solar panel 2 to the air purifier 1, the user may push a portion of the first connector 110 and turn the first connector 110 relative to the main body 10. Hence, the first connector 110 may be in a state in which a cover 119 is arranged inside the main body 10 and a first power terminal 112 is exposed to the outside of the main body 10.

As shown in FIG. 6, the first connector 110 may include a connection case 111 having top and bottom sides open, the cover 119 for covering the bottom of the connection case 111, a shaft 117 for supporting the first connector 110 to be rotatable relative to the main body 10, first and second shaft receivers 115 and 116 for rotatably supporting the shaft 117, and a first terminal receiver 113.

The connection case 111 may be provided in a form corresponding to a second connector of the solar panel 2. The connection case 111 may be substantially shaped like a hemisphere and may cover the first power terminal 112 inside.

The connection case 111 may include an opening 111a so that the first power terminal 112 may be connected to a second connector of the solar panel 2. Furthermore, the connection case 111 may include a receiver supporting groove 111b for supporting the first shaft receiver 115.

The first power terminal 112 may be arranged in the first terminal receiver 113.

The first power terminal 112 may be formed at the inner circumference formed in the middle of the top of the first terminal receiver 113.

The first power terminal 112 may be electrically connected to the second connector 120 of the solar panel 2. When the first connector 110 of the air purifier 1 is coupled to the second connector 120 of the solar panel 2, the air purifier 1 may be electrically connected to the solar panel 2. Once the air purifier 1 is electrically connected to the solar panel 2, the solar panel 2 may provide power to the air purifier 1.

The shaft 117 may support the first connector 110 so that the first connector 110 may be rotated relative to the main body 10. The shaft 117 may be rotationally coupled to the first and second shaft receivers 115 and 116.

The shaft 117 may include a wire through-hole 117a through which a wire electrically connected to the first power terminal 112 may pass. The wire passing through the wire through-hole 117a may be electrically connected to the power circuit of the air purifier 1.

The first shaft receiver 115 may rotationally support a portion of the shaft 117. The first shaft receiver 115 may include a first shaft groove 115a to accommodate the shaft 117. The first shaft receiver 115 may support the first power terminal 112.

The second shaft receiver 116 may rotationally support the other portion of the shaft 117. The second shaft receiver 116 may include a second shaft groove 116 to accommodate the shaft 117. The second shaft receiver 116 may support the cover 119.

When the first power terminal 112 is arranged inside the main body 10, the cover 119 may constitute a portion of the top of the main body 10. Specifically, the cover 119 may be arranged to be exposed to the outside of the main body 10 when the air purifier 1 is used alone. In this case, the cover 119 may be positioned on the almost same plane as the top of the main body 10. Furthermore, the cover 119 may be arranged inside the main body 10 when the air purifier 1 is used with the solar panel 2 coupled thereto.

The solar panel 2 may be detachably arranged on the top of the air purifier 1.

As shown in FIG. 5, the solar panel 2 may include the solar cell 60, a battery 70, and a bottom cover 2a.

The solar cell 60 may be arranged on the top of the solar panel 2. The solar cell 60 may convert solar energy to electric energy.

The battery 70 may be arranged inside the solar panel 2. The battery 70 may store electric energy in the form of chemical energy by converting the electric energy to the chemical energy. Furthermore, a battery sensor may be arranged in the battery 70 for detecting an input or output current and an output voltage.

The bottom cover 2a may be arranged under the solar panel 2. The second connector 120 may be arranged at the bottom cover 2a to be detachably coupled to the first connector 110 of the air purifier 1.

As shown in FIGS. 7 and 8, the second connector 120 may include a lower case 121, a supporting case 124 arranged inside the lower case 121, and a second terminal receiver 123 arranged inside the supporting case 124.

The lower case 121 may have substantially a cylindrical shape. The lower case 121 may support the supporting case 124. The lower case 121 may cover the supporting case 124 arranged inside the internal space 121a, and a second power terminal 122. The supporting case 124 may be supported by the lower case 121, and the second power terminal 122 may be arranged in an internal space 124a.

The second power terminal 122 may be arranged in the second terminal receiver 123.

A receiving space 123a may be formed under the second terminal receiver 123 for receiving the first terminal receiver 113 of the first connector 110. The second power terminal 122 may be arranged substantially in the middle of the receiving space 123a to protrude from the base of the receiving space 123a.

The second power terminal 122 may be electrically connected to the first power terminal 122. Electric energy of the battery 70 may be provided to the air purifier through the second power terminal 122 and the first power terminal 112.

The second terminal receiver 123 may be arranged inside the supporting case 124. The second power terminal 122 may be arranged to keep electric connection with the first power terminal 112 even when the second power terminal 122 is rotated in a state of being connected to the first power terminal 112.

In order for the air purifier 1 to receive power from the solar panel 2, the first power terminal 112 of the first connector 110 may be exposed to the outside, as shown in FIG. 9. Specifically, the user may turn the first connector 110 around the rotation axis 114 by pushing the cover 119 arranged outside of the first connector 110. This puts the first and second connectors 110 and 120 in a state as shown in FIG. 9.

After this, the user may couple the solar panel 2 onto the top of the air purifier 1. The solar panel 2 may be coupled onto the top of the air purifier 1 in the downward direction. Hence, the first power terminal 112 may be electrically connected to the second power terminal 122. In this case, the air purifier 1 may receive power from the solar panel 2 through the first power terminal 112 and the second power terminal 122.

Figure 10:
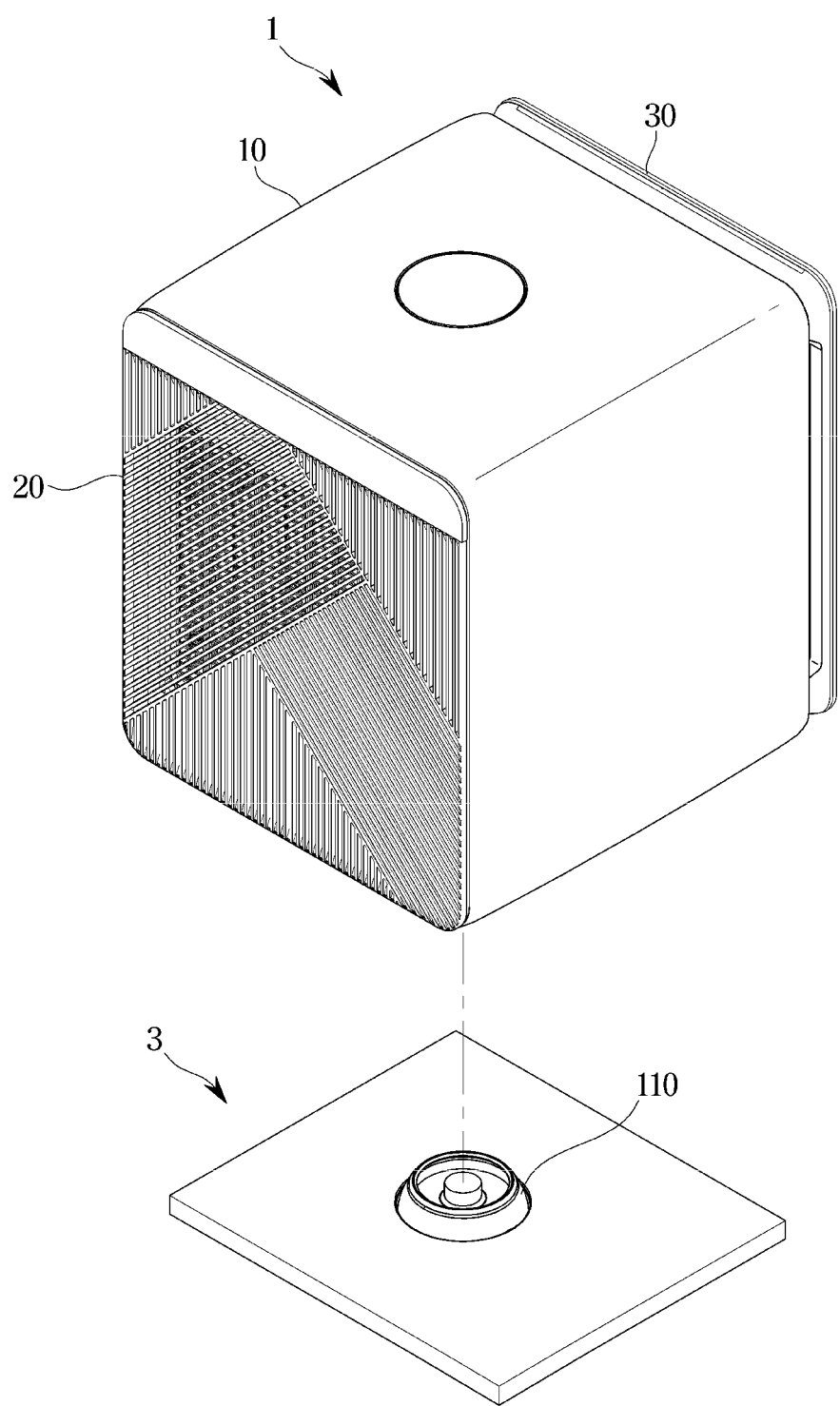
FIG. 10 illustrates an air purifier arranged on a supporting plate, according to an embodiment.
Figure 11:
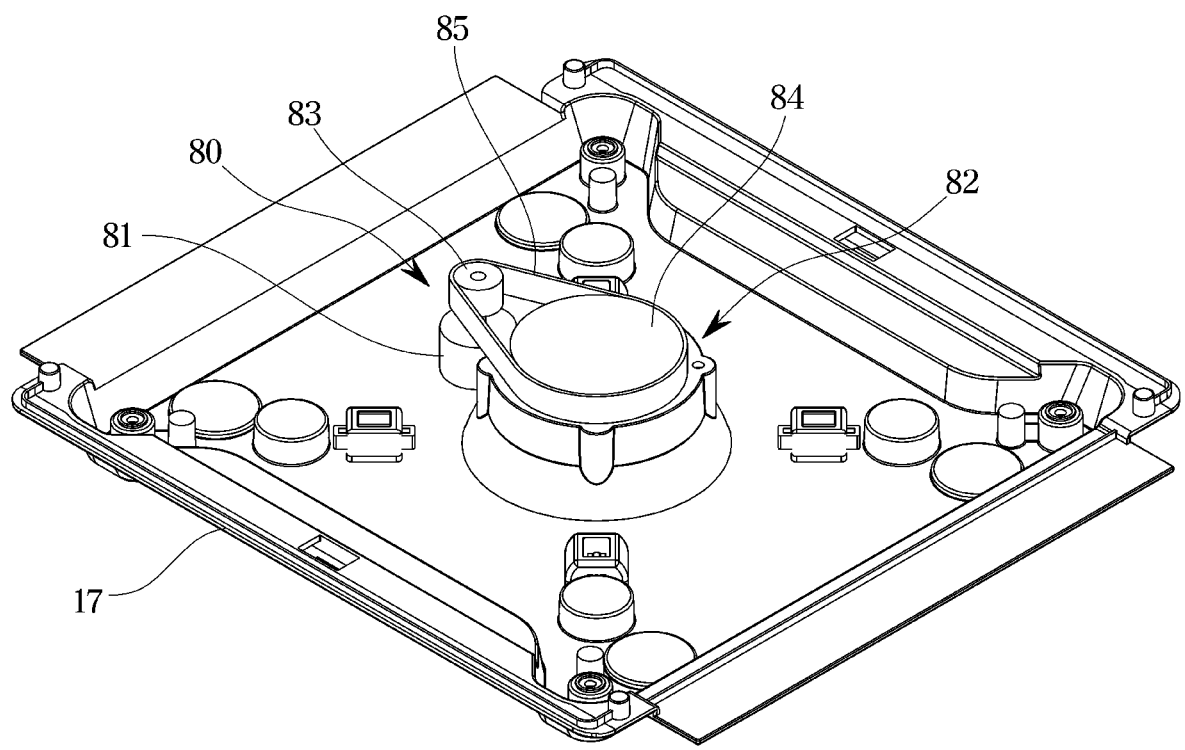
FIG. 11 illustrates a cabinet bottom side of an air purifier, according to an embodiment.

FIG. 10 illustrates an air purifier arranged on a supporting plate, according to an embodiment. FIG. 11 illustrates a cabinet bottom side of an air purifier, according to an embodiment.

As shown in FIG. 10, the air purifier 1 may be detachably installed on a supporting plate 3.

The supporting plate 3 may support and/or fix the air purifier 1.

The supporting plate 3 may also provide power to the air purifier 1. For example, the supporting plate 3 may include a power line for receiving power from an external power source and an adapter for transforming the power received from the external power source. Of course, the air purifier 1 may also be directly connected to the power line and the adapter without being connected to the supporting plate 3, and directly receive power from the external power source.

The first connector 110 may be arranged on the top of the supporting plate 3 to mechanically and electrically couple the air purifier 1 to the supporting plate 3.

The first connector 110 arranged on the top of the supporting plate 3 may be identical to the first connector of the air purifier 1 as shown in FIGS. 5 and 6. The first connector 110 may be fixed onto the top surface of the supporting plate 3 and may not be able to turn against the top surface of the supporting plate 3. For example, the first connector 110 arranged on the top of the supporting plate 3 may include the connection case, the cover, the first terminal receiver, and the first power terminal. Compared to the first connector as shown in FIGS. 5 and 6, the first connector 110 may not include the shaft and the shaft receiver.

The supporting plate 3 may provide power to the air purifier 1 through the first connector 110.

The second connector 120 may be arranged on the bottom side of the air purifier 1 to mechanically and electrically couple the air purifier 1 to the supporting plate 3. The second connector 120 may be arranged on the cabinet bottom side 17 of the air purifier 1.

The second connector 120 arranged on the cabinet bottom side 17 may be identical to the second connector of the solar panel 2 as shown in FIGS. 7 and 8. For example, the second connector 120 may include the lower case, the supporting case, the second terminal receiver, and the second power terminal.

A driving mechanism 80 for rotating the main body 10 may further be arranged on the cabinet bottom side 17.

The second connector 120 arranged at the cabinet bottom side 17 may be coupled to the supporting plate 3 or the first connector 110 arranged on the top side of another air purifier. Some portions of the second connector 120 (e.g., the lower case, the supporting case, or the second terminal receiver) may be fixed to the main body 10, and some other portions of the second connector 120 (e.g., the lower case, the supporting case, or the second terminal receiver) may be fixed to the supporting plate 3 or the first connector 110 arranged on the top side of the other air purifier.

The driving mechanism 80 may force the some other portion of the second connector 120 fixed to the supporting plate 3 or the other air purifier to be rotated. Hence, the main body 10 of the air purifier 1 may be rotated relative to the supporting plate 3 or the other air purifier.

For example, the second terminal receiver 123 of the second connector 120 may be coupled to the supporting plate 3 or the first terminal receiver 113 of the first connector 110 arranged at the other air purifier to limit rotational movement. For example, a plurality of teeth may be formed on the inner surface of the receiving space 123a of the second terminal receiver 123 to protrude from the inner surface, and a plurality of teeth may be formed on the outer surface of the first terminal receiver 113 to protrude from the outer surface. Hence, rotation of the second terminal receiver 123 relative to the first terminal receiver 113 may be limited.

The driving mechanism 80 may force the second terminal receiver 123 of the second connector 120 to be rotated. The second terminal receiver 123 forced to rotate may be rotated along with the first terminal receiver 113 of the first connector 110 relative to the main body 10. In this case, as the supporting plate 3 or the first connector 110 arranged in the other air purifier is stationary, the main body 10 may be rotated along with the second terminal receiver 123.

In another example, the lower case 121 of the second connector 120 may be coupled to the supporting plate 3 or the first terminal receiver 113 of the first connector 110 arranged at the other air purifier to limit rotational movement.

The driving mechanism 80 may force the lower case 121 of the second connector 120 to be rotated, and the lower case 121 may be rotated along with the first terminal receiver 113 of the first connector 110 relative to the main body 10.

The driving mechanism 80 may include, for example as shown in FIG. 11, a second motor 81 for causing rotation to rotate the main body 10 and a power transfer mechanism 83 for transferring the rotation of the second motor 81 to the second connector 120.

The power transfer mechanism 82 may include, for example, a first pulley 83 connected to a rotation shaft of the second motor 81, a second pulley 84 connected to a portion of the second connector 120, and a belt 85 for conveying power between the first pulley 83 and the second pulley 84.

The second motor 81 may receive power from a driving circuit and rotate in response to the received power. The rotation shaft of the second motor 81 may be connected to the first pulley 83, and the rotation of the second motor 81 may be transferred to the first pulley 83 through the rotation axis.

The first pulley 83 may receive the rotation from the rotation axis of the second motor 81, and pass the received rotation to the second pulley 84 through the belt 85.

The second pulley 84 may be coupled to, for example, the second terminal receiver 123, the lower case 121, or the supporting case 124 of the second connector 120. The second pulley 84 may receive the rotation from the first pulley 83 through the belt 85, and pass the received rotation to the second terminal receiver 123, the lower case 121, or the supporting case 124 of the second connector 120.

The power transfer mechanism 82 is not, however, limited to the pulley-belt shown in FIG. 11. For example, the power transfer mechanism 82 may include one or two or more gears. Alternatively, the power transfer mechanism 82 may be omitted. Specifically, the rotation shaft of the second motor 81 may be directly connected to the second terminal receiver 123, the lower case 121, or the supporting case 124 of the second connector 120, or the second motor 81 may be integrated in the second connector 120.

In this way, the air purifier 1 may include the second connector 120 installed on the cabinet bottom side 17, and may be mechanically or electrically connected to the supporting plate 3 through the second connector 120. Furthermore, the air purifier 1 may include the driving mechanism 80 for rotating the main body 10, and the driving mechanism 80 may rotate the main body 10 relative to the second connector 120 by forcing a portion of the second connector 120 to be rotated.

Figure 12:
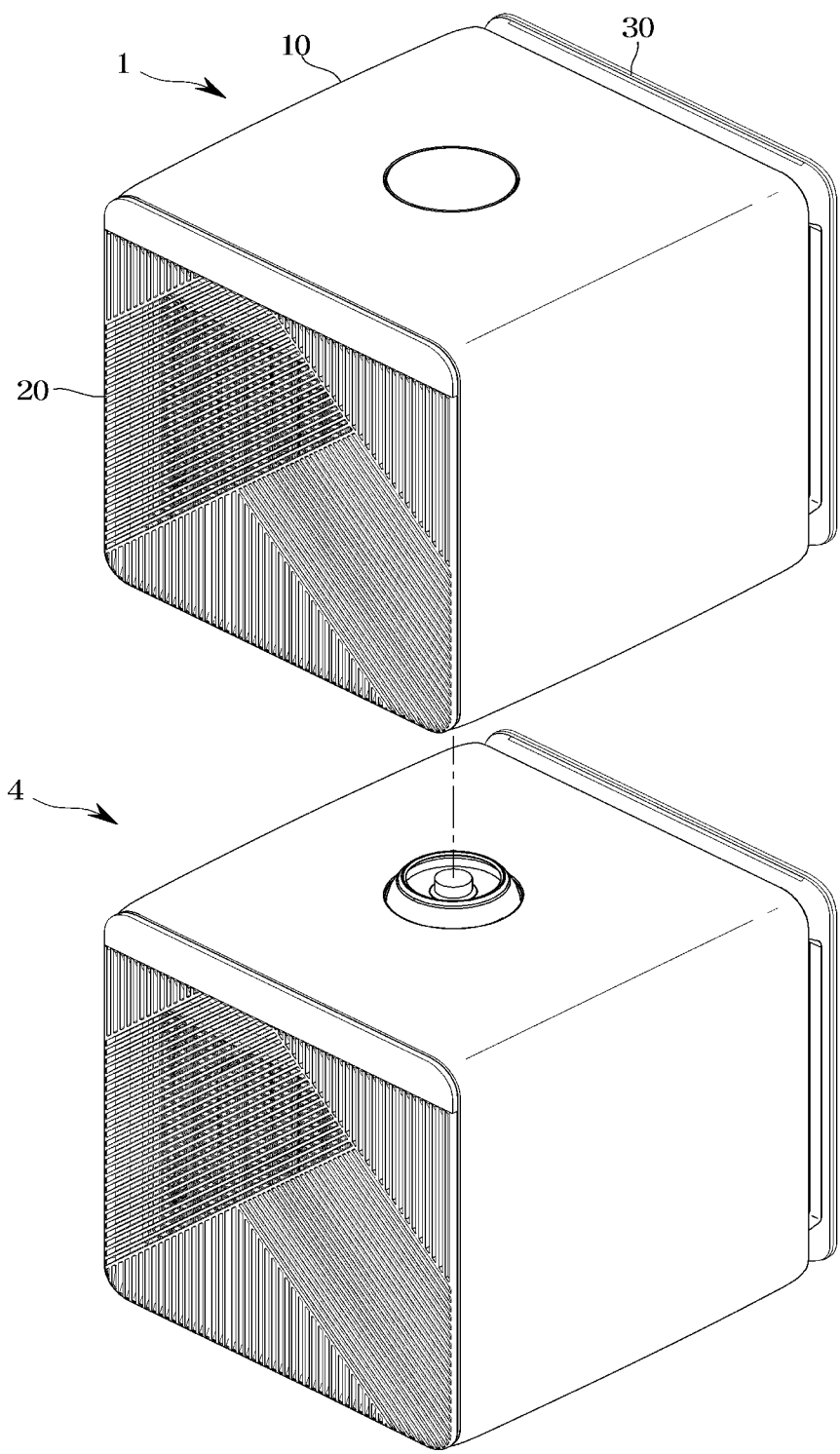
FIG. 12 illustrates an air purifier arranged on another air purifier, according to an embodiment.
Figure 13:
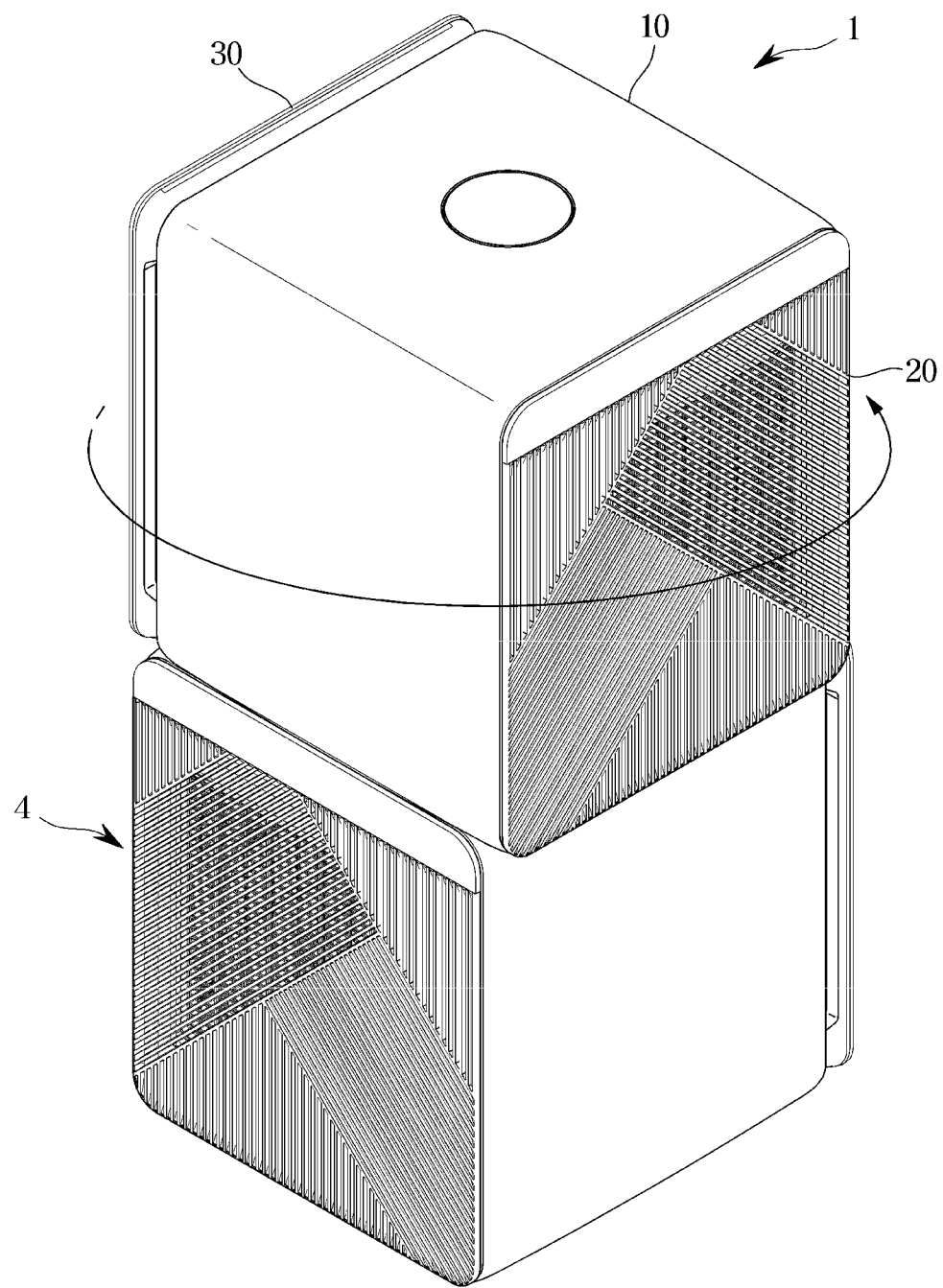
FIG. 13 illustrates an air purifier rotated on another air purifier, according to an embodiment.

FIG. 12 illustrates an air purifier arranged on another air purifier, according to an embodiment. FIG. 13 illustrates an air purifier rotated on another air purifier, according to an embodiment.

As shown in FIG. 12, the air purifier 1 may be detachably installed on another air purifier 4.

The other air purifier 4 may support and/or fix the air purifier 1.

Furthermore, the other air purifier 4 may supply power to the air purifier 1. For example, the other air purifier 4 may include a power line for receiving power from an external power source and an adapter for transforming the power received from the external power source.

As described above, the first connector 110 that may mechanically or electrically connect the air purifier 1 to another device placed on the air purifier 1 may be arranged on the top of the air purifier 1. Furthermore, the second connector 120 that may mechanically and/or electrically connect the air purifier 1 to another device placed under the air purifier 1 may be arranged on the bottom of the air purifier 1.

Similar to the air purifier 1, the other air purifier 4 may include the first connector 110 arranged on its top. The first connector 110 of the other air purifier 4 may be identical to the first connector 110 of the air purifier 1.

Furthermore, the other air purifier 4 may include the second connector 120 arranged on its bottom. The second connector 120 of the other air purifier 4 may be identical to the second connector 120 of the air purifier 1.

The air purifier 1 placed on the top of the other air purifier 4 may be mechanically and/or electrically connected to the other air purifier 4 through the second connector 120. The air purifier 1 may receive power from the other air purifier 4 through the second connector 120 or may supply power to the other air purifier 4 through the second connector 120.

Although not shown in the drawings, the air purifier 1 may be placed underneath the other air purifier 4. In this case, the air purifier 1 may be mechanically and/or electrically connected to the other air purifier 4 through the first connector 110.

The air purifier 1 placed on the top of the other air purifier 4 may be rotated relative to the other air purifier 4.

As described above, the air purifier 1 may include the driving mechanism 80 for rotating the main body 10.

For example, the driving mechanism 80 of the air purifier 1 may rotate the main body 10 of the air purifier 1 relative to the other air purifier 4, as shown in FIG. 13. Hence, a direction that the front panel 20 of the air purifier 1 faces may be different from a direction that the front panel of the other air purifier 4 faces. In other words, the air purifier 1 may discharge purified air in a different direction from the other air purifier 4.

Figure 14:
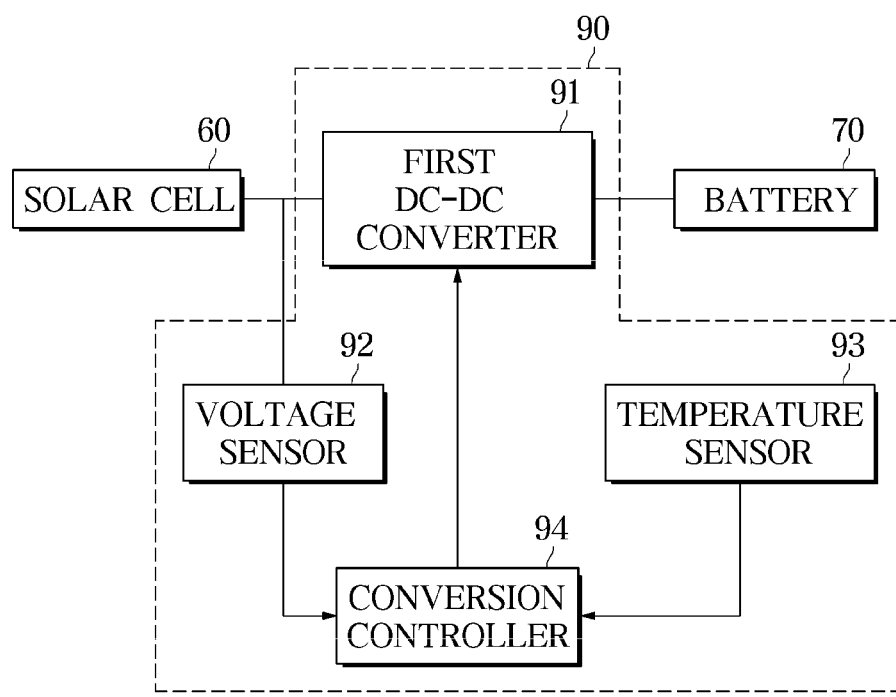
FIG. 14 illustrates a solar cell and a battery included in an air purifier, according to an embodiment.

FIG. 14 illustrates a solar cell and a battery included in an air purifier, according to an embodiment.

As shown in FIG. 14, a charging circuit 90 may be arranged between the solar cell 60 and the battery 70.

The charging circuit 90 may include a first direct current (DC) to DC converter (DC-DC converter) 91, a voltage sensor 92, a temperature sensor 93, or a conversion controller 94.

The first DC-DC converter 91 may convert a voltage of the power output from the solar cell 60 to a first voltage of the battery 70, e.g., 20 V or 24 V. The solar cell 60 may output a voltage that varies depending on an amount of incident light. For example, the voltage output by the solar cell 60 may increase the larger the amount of incident light, and the voltage output by the solar cell 60 may decrease the smaller the amount of incident light. Meanwhile, an output voltage of the battery 70 may vary depending on capacity of the battery 70 and a charge rate of the battery 70, but may follow the first voltage.

The first DC-DC converter 91 may convert the varying output voltage of the solar cell 60 to a constant first voltage. The output voltage of the solar cell 60 may be higher or lower than the first voltage, and the first DC-DC converter 91 may include a voltage conversion circuit for increasing or decreasing the input voltage. For example, the first DC-DC converter 91 may include a buck-boost converter for outputting an increased or reduced voltage.

The voltage sensor 92 may detect a voltage of the power output from the solar cell 60, and provide an electric signal that represents the output voltage of the solar cell 60, e.g., a voltage signal or a current signal, to the conversion controller 94. For example, the voltage sensor 92 may include a voltage divider, and provide an output voltage of the voltage divider to the conversion controller 94.

The temperature sensor 93 may detect the temperature of the battery 70, and provide an electric signal that represents the temperature of the battery 70 to the conversion controller 94. For example, the temperature sensor 93 may include a voltage divider including a thermistor, and provide an output voltage of the voltage divider to the conversion controller 94.

The conversion controller 94 may control an operation of the first DC-DC converter 91 based on the output signal of the voltage sensor 92 or the output signal of the temperature sensor 93.

For example, the conversion controller 94 may control the first DC-DC converter 91 to reduce the input voltage based on a magnitude of the output signal of the voltage sensor 92 being greater than a reference value that represents a first voltage. In other words, when the output voltage of the solar cell 60 is greater than the first voltage, the conversion controller 94 may control the first DC-DC converter 91 to output a reduced voltage.

Furthermore, the conversion controller 94 may control the first DC-DC converter 91 to increase the input voltage based on a magnitude of the output signal of the voltage sensor 92 being smaller than the reference value that represents the first voltage. In other words, when the output voltage of the solar cell 60 is smaller than the first voltage, the conversion controller 94 may control the first DC-DC converter 91 to output an increased voltage.

For example, the conversion controller 94 may stop operation of the first DC-DC converter 91 based on a magnitude of the output signal of the temperature sensor 93 being greater than a reference value that represents a reference temperature. In other words, when the battery 70 is overheated, the conversion controller 94 may stop operation of the first DC-DC converter 91.

In this way, the battery 70 may be charged with power having almost a constant voltage supplied from the solar cell 60.

Figure 15:
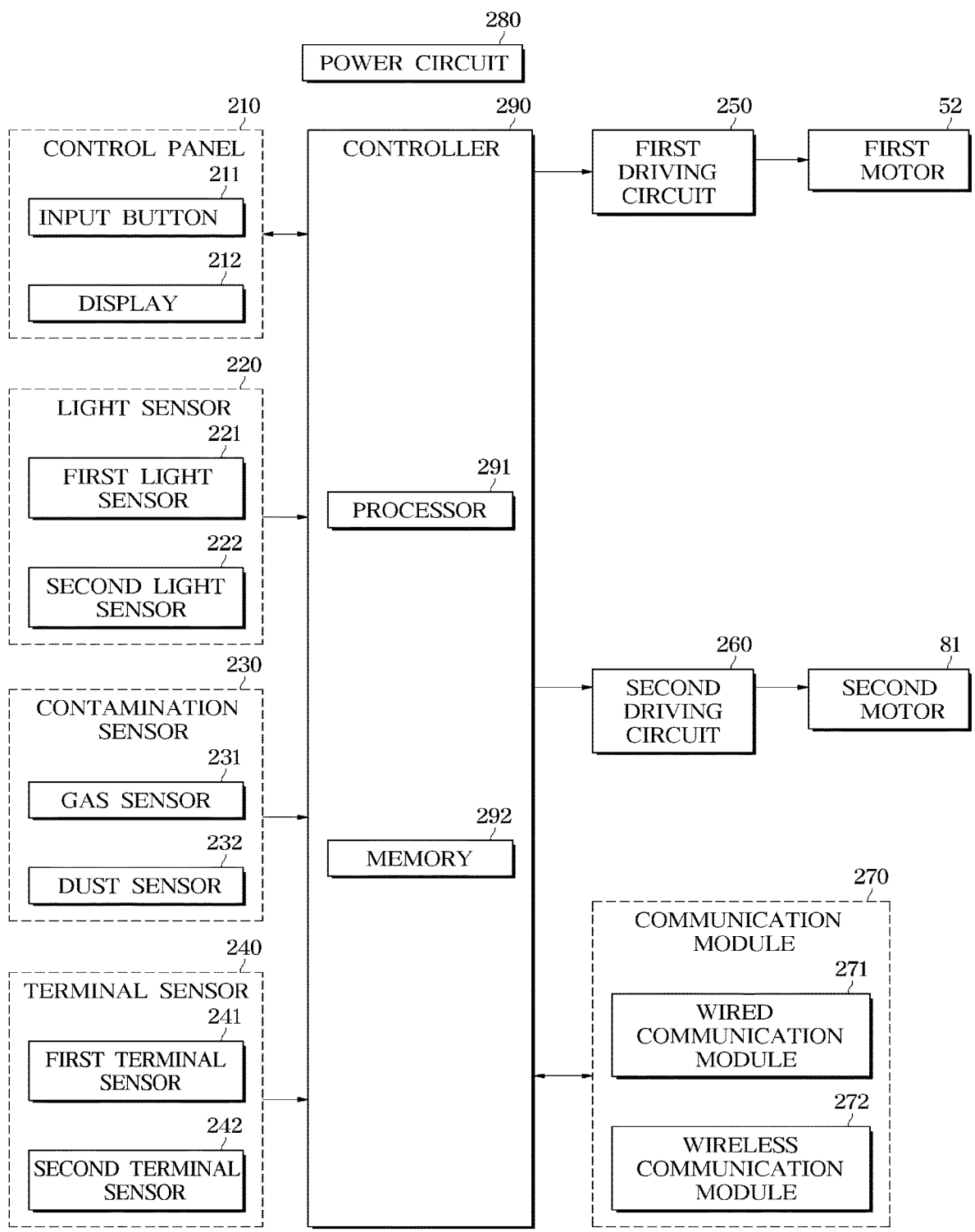
FIG. 15 illustrates a configuration of an air purifier, according to an embodiment.
Figure 16:
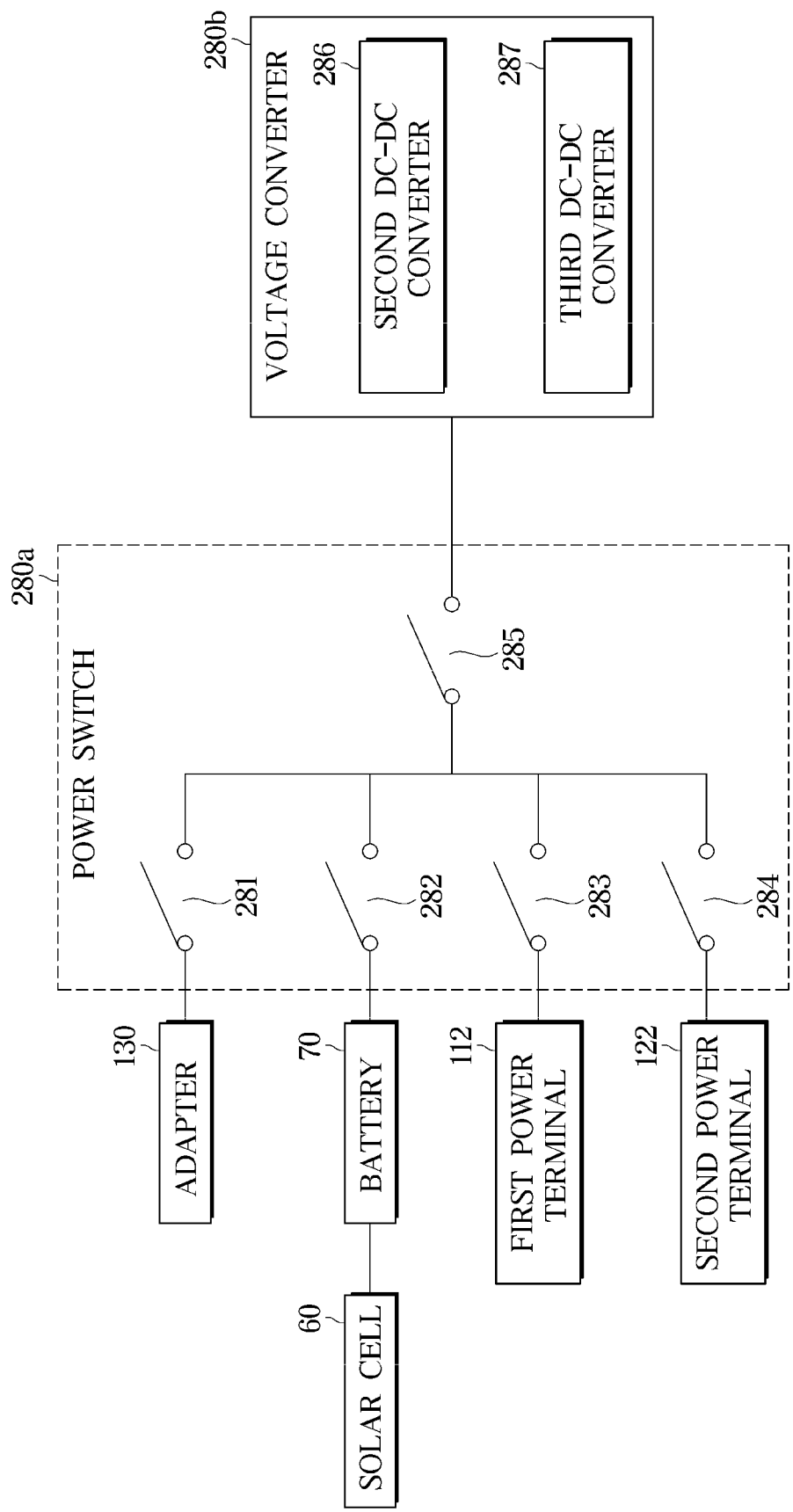
FIG. 16 illustrates a power circuit included in an air purifier, according to an embodiment.

FIG. 15 illustrates a configuration of an air purifier, according to an embodiment. FIG. 16 illustrates a power circuit included in an air purifier, according to an embodiment.

As shown in FIG. 15, the air purifier 1 may include a control panel 210, a light sensor 220, a contamination sensor 230, a terminal sensor 240, the first motor 52, a first driving circuit 250, the second motor 81, a second driving circuit 260, a communication module 270, a power circuit 280, or a controller 290.

The control panel 210 may provide the user with a user interface to interact with the user. For example, the control panel 210 may be arranged on the top of the main body 10 or in an upper portion of the front panel 20.

The control panel 210 may include an input button 211 or a display 212.

The input button 211 may obtain the user's input related to an operation of the air purifier 1. For example, the input button 211 may obtain a wind volume or wind velocity of the air discharged by the air purifier 1.

The input button 211 may include a tact switch, a push switch, a slide switch, a toggle switch, a micro switch, or a touch switch.

The display 212 may display operation information of the air purifier 1. Furthermore, the display 212 may display the user's input obtained in association with an operation of the air purifier 1. For example, the input button 212 may display a wind volume or wind velocity of the air discharged by the air purifier 1.

The display 212 may include, for example, a liquid crystal display (LCD) panel, a light emitting diode (LED) panel, or the like.

The light sensor 220 may collect information regarding an incidence direction of light from the sun. For example, the light sensor 220 may be arranged on a side of the main body 10 or on the rear side of the main body 10.

The light sensor 220 may include, for example, a first light sensor 221 and a second light sensor 222.

The first light sensor 221 and the second light sensor 222 may each receive light and output an electric signal (e.g., a voltage signal or a current signal) corresponding to an intensity of the received light. For example, each of the first light sensor 221 and the second light sensor 222 may include a photo diode or a photo resistor. The photo diode may output a voltage or current depending on an intensity of the received light. Furthermore, the photo resistor may indicate an electric resistance value depending on the intensity of the received light.

The controller 290 may identify the intensity of light that enters the first light sensor 221 based on an output of the first light sensor 221, and the intensity of light that enters the second light sensor 222 based on an output of the second light sensor 222.

The first light sensor 221 and the second light sensor 222 may be arranged on different planes or in different positions on the same plane.

For example, the first light sensor 221 may be arranged on the left side of the main body 10 and the second light sensor 222 may be arranged on the right side of the main body 10. The first light sensor 221 may output an electric signal that represents an intensity of light entering the left side of the main body 10. The second light sensor 222 may output an electric signal that represents an intensity of light entering the right side of the main body 10.

The controller 290 may identify whether the rear panel 30 of the air purifier 1, on which the solar cell 60 is installed, faces the sun, based on the output of the first light sensor 221 and the output of the second light sensor 222. For example, the controller 290 may identify that the rear panel 30 of the air purifier 1 faces the sun, based on the output of the first light sensor 221 and the output of the second light sensor 222 being almost the same. Furthermore, the controller 290 may identify that the rear panel 30 of the air purifier 1 is not facing the sun, based on the output of the first light sensor 221 and the output of the second light sensor 222 being different each other.

In another example, the first light sensor 221 may be arranged on the rear-left side, and the second light sensor 222 may be arranged on the rear-right side of the main body 10. The first light sensor 221 may output an electric signal that represents an intensity of light entering the rear-left side of the main body 10. The second light sensor 222 may output an electric signal that represents an intensity of light entering the rear-right side of the main body 10.

The controller 290 may identify whether the rear panel 30 of the air purifier 1, on which the solar cell 60 is installed, faces the sun, based on the output of the first light sensor 221 and the output of the second light sensor 222. For example, the controller 290 may identify that the rear panel 30 of the air purifier 1 faces the sun, based on the average of the output of the first light sensor 221 and the output of the second light sensor 222 being equal to or greater than a first reference value. Furthermore, the controller 290 may identify that the rear side of the air purifier 1 is shaded, based on the difference between the output of the first light sensor 221 and the output of the second light sensor 222 being equal to or greater than a second reference value.

The contamination sensor 230 may collect information about contaminants contained in the air in the space to be purified. For example, the contamination sensor 230 may collect information about a density of particles in the air that cause odor (hereinafter, called a 'gas') and/or information about a density of dust.

The contamination sensor 230 may include a gas sensor 231 or a dust sensor.

The gas sensor 231 may measure a density of the gas contained in the air and output an electric signal that represents the density of the gas. For example, the gas sensor 231 may use a change in electrical conductivity of a semiconductor device, which occurs when the gas is captured on the surface of the semiconductor, to detect the gas in the air or measure a density of the gas in the air.

The controller 290 may identify the density of the gas contained in the air in the space to be purified based on the output of the gas sensor 231.

The dust sensor 232 may measure a temperature of the dust contained in the air, and output an electric signal that represents the density of the dust. For example, the dust sensor 232 may use the scattering of light due to dust contained in the air to detect the dust in the air or measure a density of the dust in the air. The dust sensor 232 may include a light source for emitting light, and a light sensor arranged at a location out of a path of the light emitted from the light source. The dust sensor 232 may output an electric signal that represents an intensity of light received by the light sensor.

The controller 290 may identify the density of dust contained in the air in the space to be purified based on the output of the dust sensor 232.

The terminal sensor 240 may include, for example, a first terminal sensor 241 and a second terminal sensor 242.

The first terminal sensor 241 may detect whether the first connector 110 is connected to another device (e.g., the solar panel or another air purifier), and output an electric signal that represents whether the first connector 110 is connected to the other device. For example, the first terminal sensor 241 may include a micro switch. The micro switch may output a high-voltage signal when the first connector 110 is connected to the other device and a low-voltage signal when the first connector 110 is not connected to the other device.

The second terminal sensor 242 may detect whether the second connector 120 is connected to another device (e.g., the supporting plate or another air purifier), and output an electric signal that represents whether the second connector 120 is connected to the other device. For example, the second terminal sensor 242 may include a micro switch.

The first motor 52 may rotate the fan wings 51. The first motor 52 may suck in outside air through the inlet 12 and discharge purified air through the outlet 11 by rotating the fan wings 51.

A wind volume or wind velocity of the air purifier 1 may depend on the rotational speed of the first motor 52. The wind volume or wind velocity of the air purifier 1 may increase the higher the rotational speed of the first motor 52. Furthermore, the wind volume or wind velocity of the air purifier 1 may decrease the lower the rotational speed of the first motor 52.

The first driving circuit 250 may supply driving power to the first motor 52 for rotation. The first driving circuit 250 may control the driving power to be supplied to the first motor 52 based on a control signal of the controller 290. The first driving circuit 250 may increase the driving power to be supplied to the first motor 52 to increase the rotational speed of the first motor 52. Furthermore, the first driving circuit 250 may reduce the driving current to be applied to the first motor 52 to reduce the rotational speed of the first motor 52. For example, the first driving circuit 250 may receive a pulse width modulation (PWM) signal from the controller 290, and supply PWM driving power to the first motor 52.

The second motor 81 may rotationally move the main body 10 of the air purifier 1. The second motor 81 may rotate a fixed portion of the second connector 120 through the driving mechanism 80, and accordingly rotate the main body 10 of the air purifier 1.

The second driving circuit 260 may supply driving power to the second motor 81 for rotation. The second driving circuit 260 may control the driving power to be supplied to the second motor 81 based on a control signal of the controller 290. The second driving circuit 260 may supply positive power to the second motor 81 to rotate the second motor 81 in a first direction, or supply negative power to the second motor 81 to rotate the second motor 81 in a second direction. Furthermore, the second driving circuit 260 may supply pulses to a plurality of terminals of the second motor 81 in a first sequence to rotate the second motor 81 in the first direction. Moreover, the second driving circuit 260 may supply pulses to the plurality of terminals in a second sequence to rotate the second motor 81 in the second direction.

The communication module 270 may include a communication circuit for exchanging data directly with the other air purifier 4 or a communication circuit for exchanging data with the other air purifier 4 through a service server.

The communication module 270 may include a wired communication module 271 for exchanging data with the other air purifier 4 wiredly or a wireless communication module 272 for exchanging data with the other air purifier 4 wirelessly.

The wired communication module 271 may access, for example, a wired communication network and communicate with the other air purifier 4 over the wired communication network. The wired communication module 271 may access the wired communication network through Ethernet, the IEEE 802.3 technology standard, and transmit or receive data to or from the other air purifier 4 via a server over the wired communication network.

Furthermore, the wired communication module 271 may communicate directly with the other air purifier 4 through a communication line connected to the other air purifier 4.

The wireless communication module 272 may communicate wirelessly with e.g., a base station or an access point (AP), and access the wired communication network via the base station or the AP. The wireless communication module 272 may communicate with the other air purifier 4 connected to the wired communication network via the base station or the AP. For example, the wireless communication module 272 may use Wi-Fi, the IEEE 802.11 technology standard, to communicate with an AP, or use code divisional multiple access (CDMA), wideband code division multiple access (WCDMA), Global Systems for Mobile communications (GSM), Long Term Evolution (LTE), WiBro, etc., to communicate with a base station. The wireless communication module 272 may also transmit or receive data to or from the other air purifier 4 via a service server over the wired communication network.

Furthermore, the wireless communication module 272 may wirelessly communicate directly with the other air purifier 4. For example, the wireless communication module 272 may use Wireless Fidelity (Wi-Fi), Bluetooth™, which is the IEEE 802.15.1 technology standard, ZigBee™, which is the IEEE 802.15.4 technology standard, etc., to wirelessly transmit or receive data directly to or from the other air purifier 4.

The power circuit 280 may supply power to the control panel 210, the light sensor 220, the contamination sensor 230, the first motor 52, the first driving circuit 250, the second motor 81, the second driving circuit 260, the communication module 270 or the controller 290.

The power circuit 280 may receive power from at least one of a plurality of power sources, and distribute the received power to the respective components included in the air purifier 1. The plurality of power sources may include, for example, the adapter connected to an external power source and detachably connected to the air purifier 1, the battery 70 connected to the solar cell 60 and storing power produced by the solar cell 60, the first power terminal 112 that may receive power from another device (e.g., the solar panel) arranged on top of the air purifier 1, or the second power terminal 122 that may receive power from another device (e.g., the supporting plate) arranged underneath the air purifier 1.

The power circuit 280 may receive power from the adapter 130 connected to the external power source, the battery 70 connected to the solar cell 60, the first power terminal 112 connected to the other air purifier, or the second power terminal 122 connected to the other air purifier.

The power circuit 280 may include, for example, a power switch 280a for receiving power from one of the adapter 130, the battery 70, the first power terminal 112 or the second power terminal 122, and a voltage converter 280b for converting a voltage of the received power.

The power switch 280a may include, for example, a first switch 281 connected to the adapter 130, a second switch 282 connected to the battery 70, a third switch 283 connected to the first power terminal 112, a fourth switch 284 connected to the second power terminal 122, or a fifth switch 285 connected to the voltage converter 280b.

The power switch 280a may close (turn on) at least one of the first switch 281, the second switch 282, the third switch 283, or the fourth switch 284 in response to a control signal of the controller 290. For example, when the adapter 130 is decoupled from the main body 10, the power switch 280a may open (turn off) the first switch 281. When the adapter 130 is coupled to the main body 10 and the charge rate of the battery 70 is lower than a threshold, the power switch 280a may close (turn on) the first switch 281 and open (turn off) the second switch 282. Furthermore, when the air purifier 1 is connected to another device on the top or bottom, the power switch 280a may close (turn on) the third switch 283 or the fourth switch 284.

The power switch 280a may close (turn on) the fifth switch 285 for operation of the air purifier 1.

The power switch 280a may include a metal-oxide-semiconductor field effect transistor (MOSFET), a bipolar junction transistor (BJT) or an insulated gate bipolar transistor (IGBT). Furthermore, the power switch 280a may include, for example, a back-to-back switch.

The voltage converter 280b may receive power from a power source selected by the power switch 280a. The voltage converter 280b may convert the received power to power with various voltages.

Components included in the air purifier 1 may have different operation voltages. Furthermore, the power source to supply power to the air purifier 1 is able to output different voltages. For example, the adapter 130 or the battery 70 may output a first voltage, e.g., 20 V or 24 V. A second voltage, e.g., 3.3 V or 5 V, may be applied to the controller 290 including a digital logic circuit or the control panel 210. Furthermore, a third voltage, e.g., 12 V or 15 V, may be applied to the first motor 52 or the second motor 81.

The voltage converter 280b may convert the voltage of power received from the power source, and provide the components included in the air purifier 1 with power having the converted voltage.

The voltage converter 280b may include a second DC-DC converter 286 for converting e.g., the first voltage to the second voltage, and a third DC-DC converter 287 for converting e.g., the first voltage to the third voltage.

The second voltage may be lower than the first voltage output by the power source, and the second DC-DC converter 286 may include a voltage conversion circuit for reducing the input voltage. For example, the second DC-DC converter 286 may include a buck converter for outputting a reduced voltage and a conversion controller for controlling the buck converter.

The third voltage may also be lower than the first voltage, and the third DC-DC converter 287 may also include a voltage conversion circuit for reducing the input voltage. For example, the third DC-DC converter 287 may include a buck converter and a conversion controller.

The controller 290 may be electrically connected to the control panel 210, the light sensor 220, the contamination sensor 230, the first driving circuit 250, the second driving circuit 260, or the communication module 270. The controller 290 may process the output signal received from the light sensor 220 or the contamination sensor 230, and provide a control signal to the first driving circuit 250 or the second driving circuit 250. Furthermore, the controller 290 may receive a communication signal from the communication module 270 and provide the communication signal.

The controller 290 may include a processor 291 for generating a control signal to control operation of the air purifier 1, and a memory 292 for memorizing and/or storing a program and data for generating the control signal. The processor 291 and the memory 292 may be implemented with separate semiconductor devices or in a single semiconductor device.

The processor 291 may process data and/or a signal based on the program memorized or stored in the memory 292, and provide a control signal to each component of the air purifier 1 based on the processing result.

For example, the processor 291 may provide a control signal to the display 212 to display operation information in response to a user input through the input button 211. The processor 291 may provide a control signal to the first driving circuit 250 to control rotational speed of the first motor 52 in response to a user input through the input button 211. The processor 291 may provide a control signal to the first driving circuit 250 to control rotation of the first motor 52 based on an output of the contamination sensor 230. The processor 291 may provide a control signal to the second driving circuit 260 to control rotation of the second motor 81 based on an output of the light sensor 220.

The processor 291 may obtain an electric signal that represents an input or output current and an output voltage of the battery 70 from a battery sensor arranged in the battery 70, and identify a charge rate of the battery 70 based on the input or output current and the output voltage of the battery 70.

The processor 291 may identify whether the first connector 110 is connected to the solar panel 2 or another air purifier based on the output signal of the first terminal sensor 241. In other words, the processor 291 may identify whether the first power terminal 112 is connected to another device. Furthermore, the processor 291 may identify whether the second connector 120 is connected to the supporting plate 3 or another air purifier based on the output signal of the second terminal sensor 242. In other words, the processor 291 may identify whether the second power terminal 122 is connected to another device.

The processor 291 may identify whether the adapter 130 is connected to the main body 10.

The processor 291 may control the power switch 280a based on the charge rate of the battery 70, whether the first power terminal 112 is connected to the solar panel 2 or another air purifier, whether the second power terminal 122 is connected to the supporting plate 3 or another air purifier, or whether the adapter 130 is connected to the main body 10.

The memory 292 may memorize/store a program and data for controlling a purifying operation of the air purifier 1.

The memory 292 may include a non-volatile memory or a volatile memory.

The non-volatile memory may store e.g., the program and/or data electrically, magnetically, or optically. The non-volatile memory may include, for example, a read-only memory (ROM) for storing data for a long period, or a flash memory. Furthermore, the non-volatile memory may include a solid state drive (SSD), a hard disc drive (HDD), an optical disc drive (ODD), or the like.

The volatile memory may load e.g., the program and/or data from the non-volatile memory and electrically store the program and/or data. The volatile memory may include, for example, a static random access memory (SRAM), a dynamic RAM (DRAM), or the like.

The memory 292 may store/memorize a program and data such as an operating system (OS), middleware and application, and the like, and provide the program and data to the processor 291 in response to a request from the processor 291.

The memory 292 may include a memory device, or multiple memory devices.

In this way, the controller 290 may control the posture of the air purifier 1 based on a light incidence direction. Furthermore, the controller 290 may control power application to each component of the air purifier 1 based on whether the adapter 130 is connected or a charge rate of the battery 70.

Figure 17:
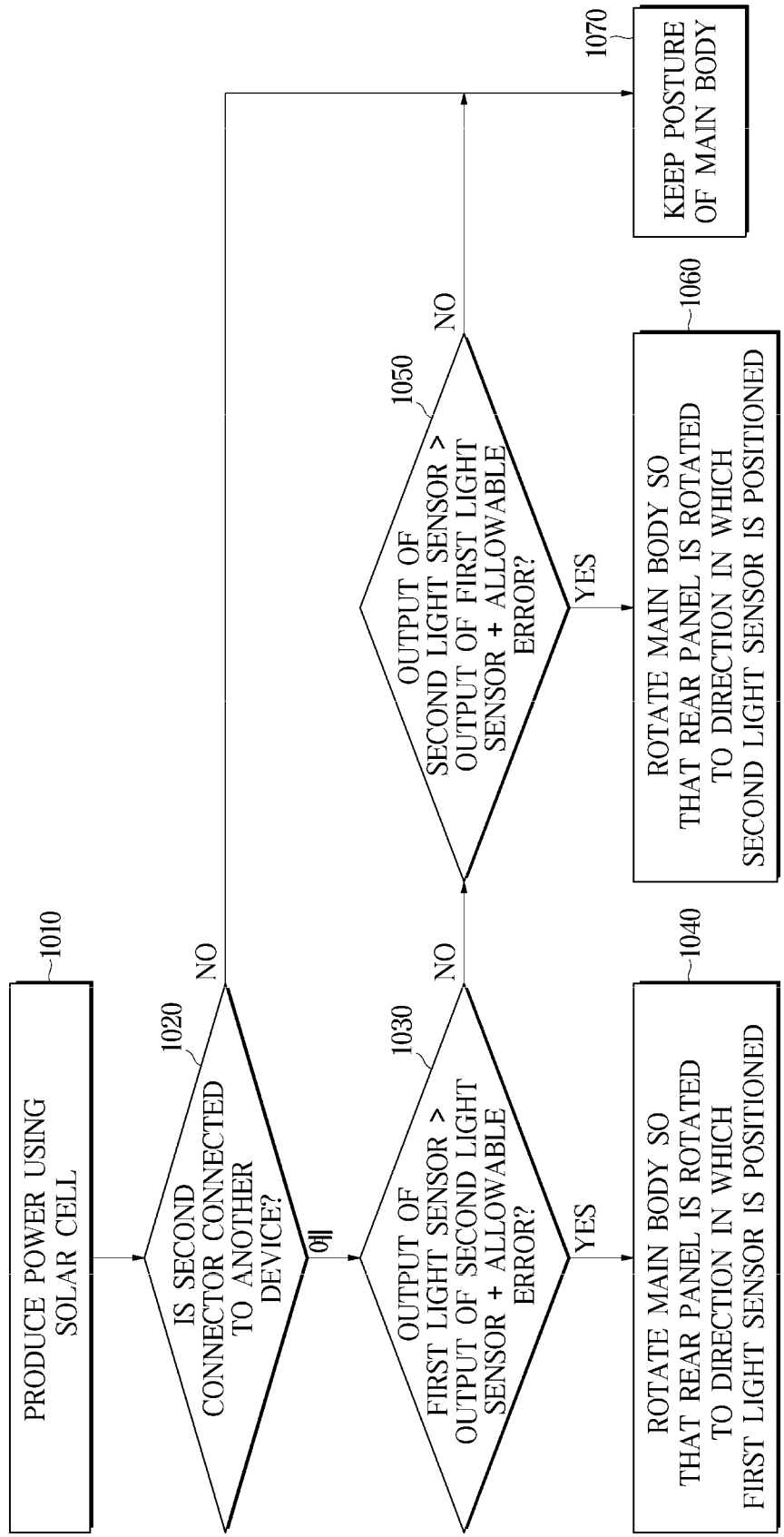
FIG. 17 illustrates an operation of an air purifier according to an embodiment.
Figure 18:
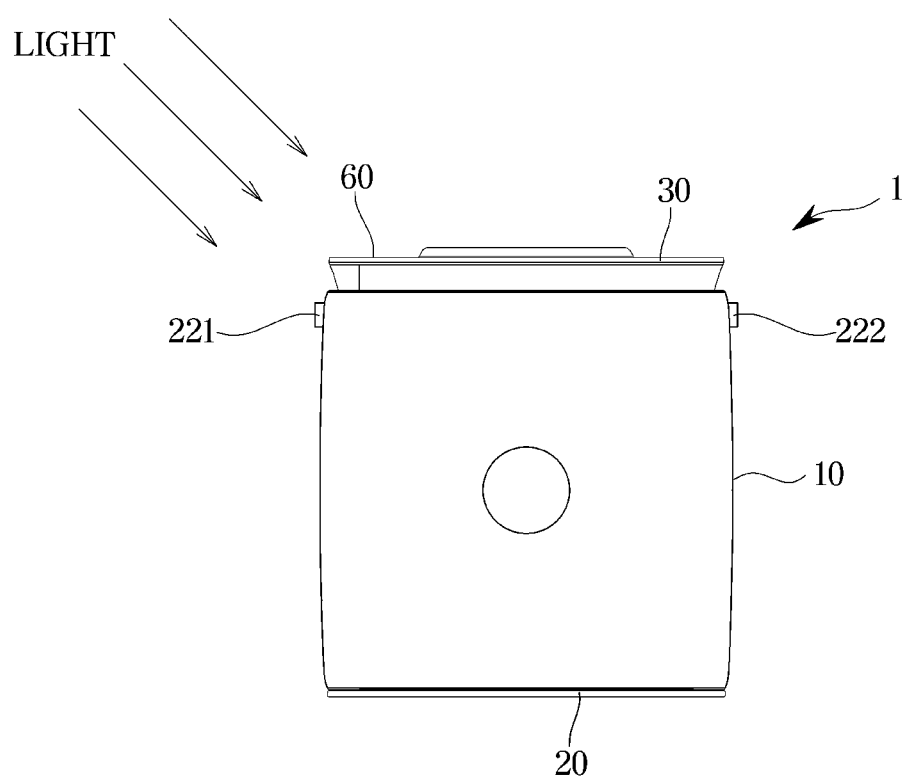
FIG. 18 illustrates light incidence to an air purifier according to an embodiment.
Figure 19:
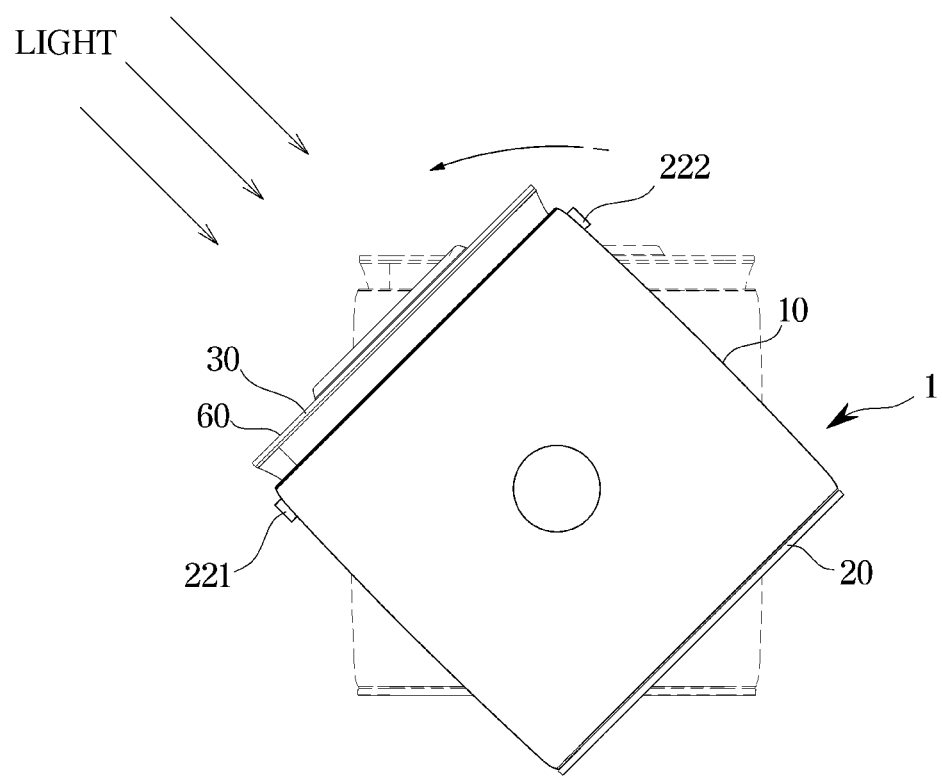
FIG. 19 illustrates rotation of an air purifier according to an embodiment.

FIG. 17 illustrates an example of an operation of an air purifier according to an embodiment. FIG. 18 illustrates light incidence to an air purifier according to an embodiment. FIG. 19 illustrates rotation of an air purifier according to an embodiment.

In connection with FIGS. 17, 18 and 19, an operation 1000 in which the air purifier 1 controls the posture of the main body 10 will be described.

The air purifier 1 may produce power using the solar cell 60, in 1010.

For example, the solar cell 60 may convert solar energy to electric energy. In other words, the solar cell 60 may produce power.

The battery 70 may convert the electrical energy obtained from the solar cell 60 to chemical energy and store the chemical energy. In other words, the battery 70 may store the power produced by the solar cell 60.

The air purifier 1 may identify whether the second connector 120 is connected to another device, in 1020. When no other device is connected to the second connector 120 (no of 1020), the air purifier 1 may keep the posture of the main body 10, in 1070.

For example, the controller 290 may identify whether the second connector 120 is connected to the supporting plate 3 or another air purifier based on the output signal of the second terminal sensor 242.

When the second connector 120 is not connected to the supporting plate 3 or the other air purifier, the main body 10 of the air purifier 1 may not be rotated around the second connector 120. Hence, the air purifier 1 may keep the current posture without rotation.

When the other device is connected to the second connector 120 (yes of 1020), the air purifier 1 may identify whether the magnitude of a first output signal of the first light sensor 221 is larger than the sum of the magnitude of a second output signal of the second light sensor 222 and an allowable error, in 1030.

For example, the first light sensor 221 may be arranged on the left side of the main body 10 and may output an electric signal corresponding to an intensity of light entering the left side of the main body 10. As the intensity of light entering the left side increases, the magnitude of an output signal of the first light sensor 221 may increase, and as the intensity of light entering the left side decreases, the magnitude of an output signal of the first light sensor 221 may decrease.

Furthermore, the second light sensor 222 may be arranged on the right side of the main body 10 and may output an electric signal corresponding to an intensity of light entering the right side of the main body 10. As the intensity of light entering the right side increases, the magnitude of an output signal of the second light sensor 222 may increase, and as the intensity of light entering the right side decreases, the magnitude of an output signal of the second light sensor 222 may decrease.

The controller 290 may compare the magnitude of the first output signal with the sum of the magnitude of the second output signal and the allowable error, to identify a light incidence direction. The allowable error may indicate an allowable difference between the magnitude of the first output signal and the magnitude of the second output signal. The allowable error may set experimentally or empirically.

When the magnitude of the first output signal is larger than the sum of the magnitude of the second output signal and the allowable error (yes of 1030), the air purifier 1 may rotate the main body 10 so that the rear panel 30 is rotated to a direction in which the first light sensor 221 is positioned, in 1040.

For example, the controller 290 may identify entrance of the light into a side where the first light sensor 221 is arranged, based on the magnitude of the first output signal being larger than the sum of the magnitude of the second output signal and the allowable error.

As shown in FIG. 18, the light may enter the rear-left side of the main body 10. Hence, the magnitude of the first output signal of the first light sensor 221 may be larger than the magnitude of the second output signal by the allowable error or more. Accordingly, efficiency of solar power of the solar cell 60 arranged on the rear panel 30 may be reduced.

The controller 290 may rotate the main body 10 to increase the efficiency of the solar power of the solar cell 60 arranged on the rear panel 30. The controller 290 may rotate the main body 10 such that the rear panel 30 on which the solar cell 60 is installed faces a light incidence direction. In other words, the controller 290 may rotate the main body 10 such that the rear panel 30 is rotated to the left direction of the main body 10 in which the first light sensor 221 is installed. The controller 290 may rotate the main body 10 such that the rear panel 30 faces a direction (rear-left direction) in which the first light sensor 221 is positioned.

The controller 290 may control the second driving circuit 260 such that the second motor 81 rotates the main body 10. For example, as shown in FIG. 19, the controller 290 may control the second driving circuit 260 such that the second motor 81 rotates the main body 10 counterclockwise.

When the magnitude of the first output signal is not larger than the sum of the magnitude of the second output signal and the allowable error (no of 1030), the air purifier 1 may identify whether the magnitude of a second output signal of the second light sensor 222 is larger than the sum of the magnitude of the first output signal of the first light sensor 221 and an allowable error, in 1050.

For example, the controller 290 may compare the magnitude of the second output signal with the sum of the magnitude of the first output signal and the allowable error, to identify a light incidence direction.

When the magnitude of the second output signal is larger than the sum of the magnitude of the first output signal and the allowable error (yes of 1050), the air purifier 1 may rotate the main body 10 so that the rear panel 30 is rotated to a direction in which the second light sensor 222 is positioned, in 1060.

For example, the controller 290 may identify entrance of the light into a side where the second light sensor 222 is arranged, based on the magnitude of the second output signal being larger than the sum of the magnitude of the first output signal and the allowable error.

The controller 290 may rotate the main body 10 so that the rear panel 30 faces the light incidence direction, to increase the efficiency of the solar power of the solar cell 60 arranged on the rear panel 30. In other words, the controller 290 may rotate the main body 10 such that the rear panel 30 faces a direction (rear-left direction) in which the second light sensor 222 is positioned.

When the magnitude of the second output signal is not larger than the sum of the magnitude of the first output signal and the allowable error (no of 1050), the air purifier 1 may keep the current posture of the main body 10, in 1070.

For example, the controller 290 may control the second driving circuit 260 to keep the current posture of the main body 10 without rotation, based on the magnitude of the first output signal being equal to the magnitude of the second output signal. The controller 290 may control the second driving circuit 260 to keep the current posture of the main body 10 without rotation, based on the magnitude of the first output signal being less than the magnitude of the second output signal by the allowable error.

In this way, the air purifier 1 may rotate the main body 10 so that the solar cell 60 faces a light incidence direction. Hence, the air purifier 1 may increase efficiency of solar power of the solar cell 60.

Figure 20:
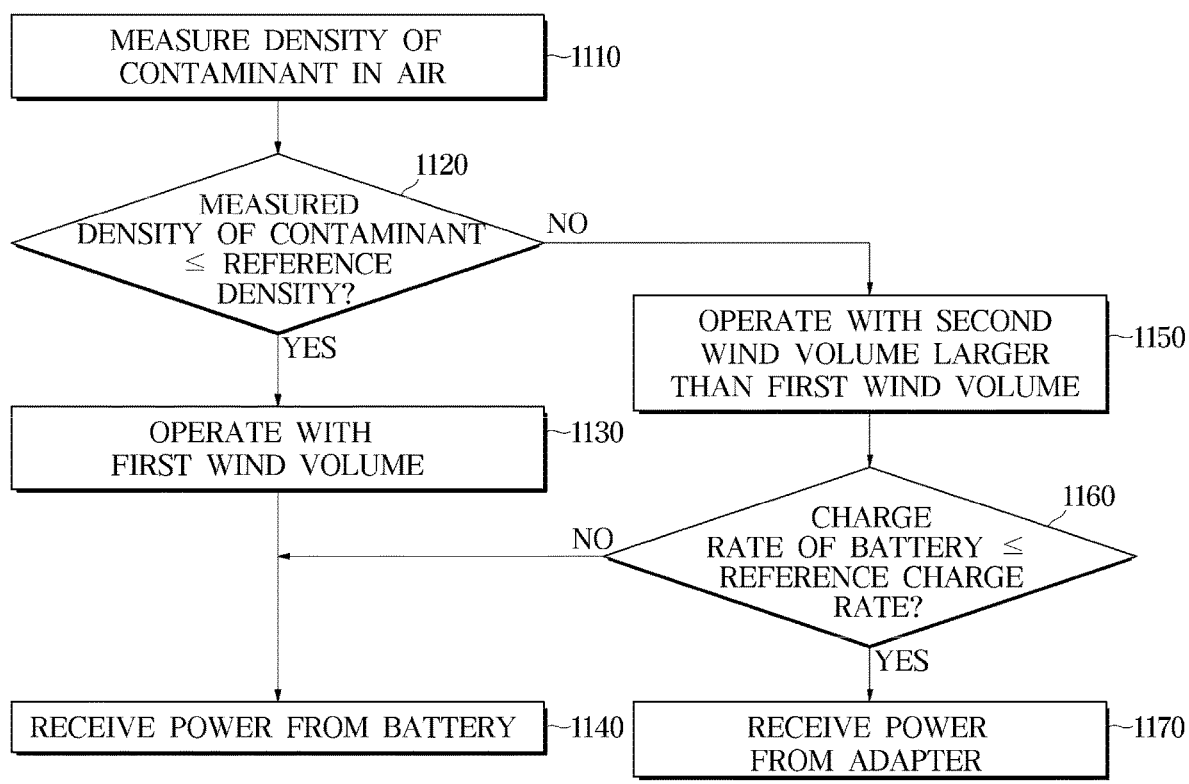
FIG. 20 illustrates an operation of an air purifier according to an embodiment.
Figure 21:
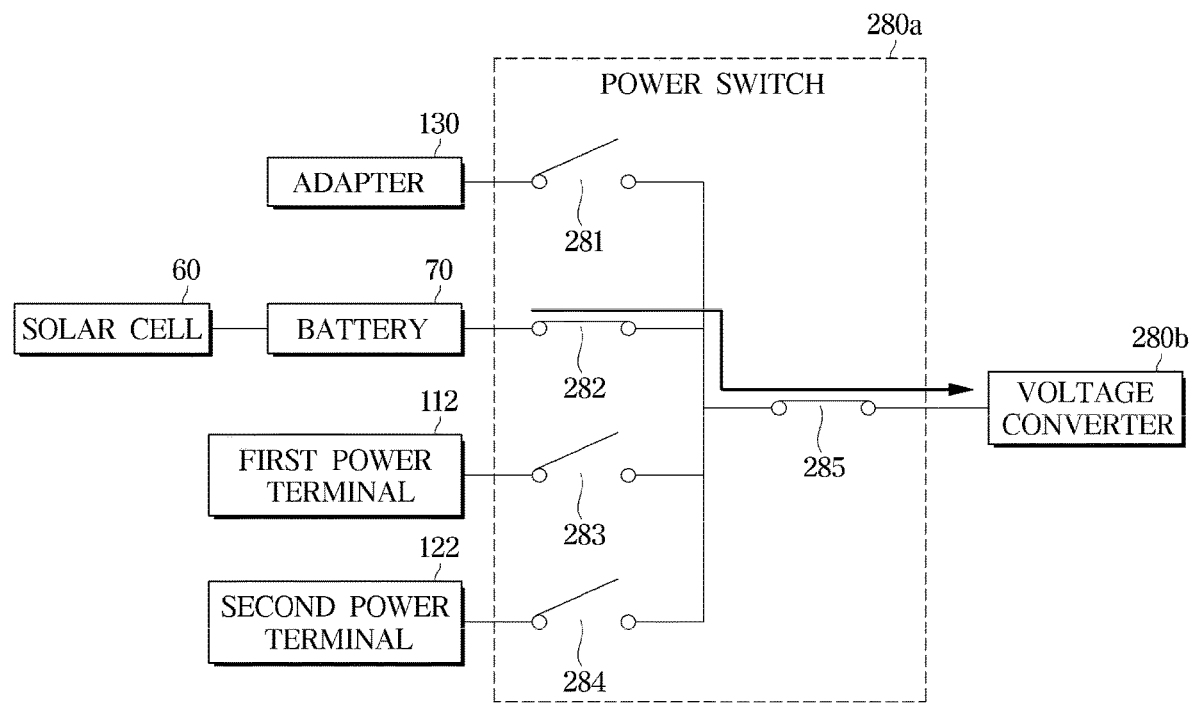
FIG. 21 illustrates an air purifier receiving power from a battery, according to an embodiment.
Figure 22:
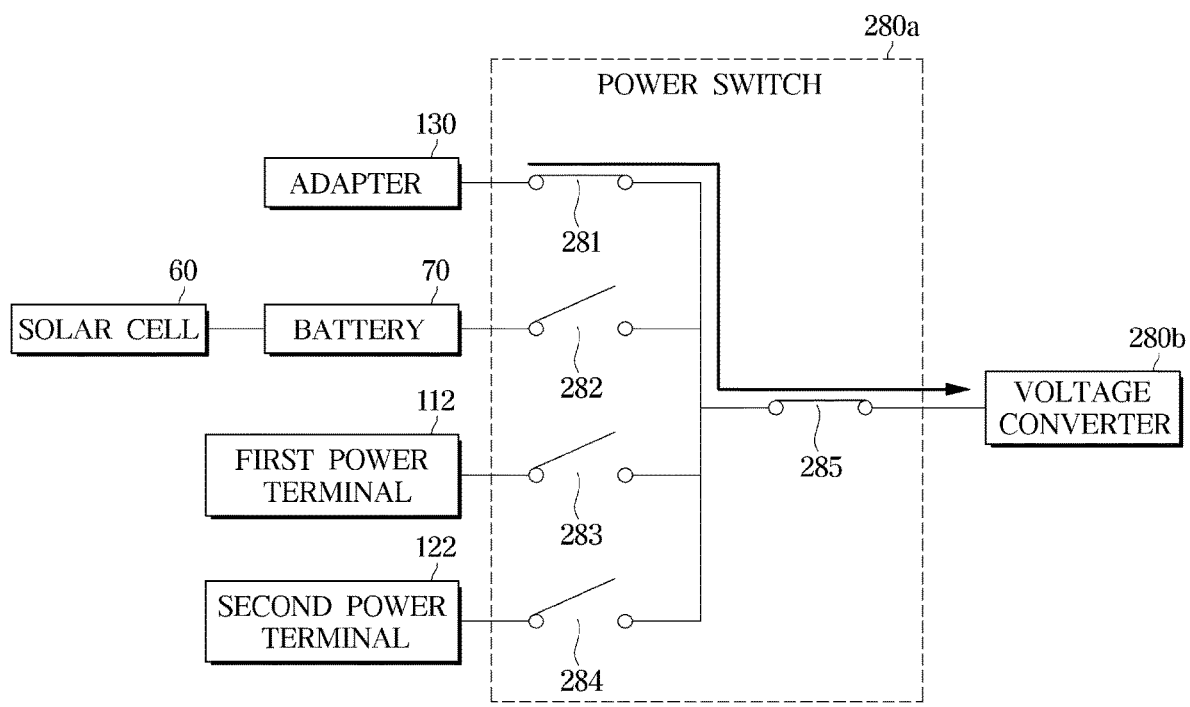
FIG. 22 illustrates an air purifier receiving power from an adapter, according to an embodiment.

FIG. 20 illustrates an operation of an air purifier according to an embodiment. FIG. 21 illustrates an air purifier receiving power from a battery, according to an embodiment. FIG. 22 illustrates an air purifier receiving power from an adapter, according to an embodiment.

In connection with FIGS. 20, 21 and 22, an operation 1100 in which the air purifier 1 controls power reception will be described.

The air purifier 1 may measure a density of contaminants in the air, in 1110.

For example, the contamination sensor 230 may measure the density of the contaminants in the air in the space to be purified. The gas sensor 231 may output an electric signal corresponding to the density of gas in the space to be purified. Furthermore, the dust sensor 232 may output an electric signal corresponding to a density of dust in the space to be purified.

The controller 290 may identify the density of gas in the air based on the output signal of the gas sensor 231 and identify the density of dust in the air based on the output signal of the dust sensor 232.

The air purifier 1 may identify whether the density of the measured contaminants is equal to or less than a reference density, in 1120.

For example, the controller 290 may compare the density of gas based on the output signal of the gas sensor 231 with the reference density of gas. The reference density of gas may represent a density of gas to increase a wind volume (or wind velocity) of the air purifier 1 to a next level (e.g., from a first wind volume to a second wind volume).

The controller 290 may compare a density of dust based on the output signal of the dust sensor 232 with a reference density of dust. The reference density of dust may represent a density of dust to increase a wind volume (or wind velocity) of the air purifier 1 to a next level (e.g., from a first wind volume to a second wind volume).

When the measured density of gas is equal to or less than the reference density of gas and the measured density of dust is equal to or less than the reference density of dust, the controller 290 may identify that the measured density of the contaminants is equal to or less than the reference density.

When the measured density of the contaminants is equal to or less than the reference density (yes of 1120), the air purifier 1 may operate with a first wind volume (or first wind velocity), in 1130.

For example, the controller 290 may rotate the first motor 52 at a first speed so that the air purifier 1 is operated with the first wind volume (or first wind velocity) based on the measured density of gas is equal to or less than the reference density of gas and the measured density of dust is equal to or less than the reference density of dust. The controller 290 may control the first driving circuit 250 such that the first motor 52 is rotated at a first speed.

The power consumed by the air purifier 1 operated with the first wind volume may be lower than power produced by the solar cell 60. In other words, the air purifier 1 may be operated with the first wind volume by consuming the power produced by the solar cell 60 without consuming power charged in the battery 70.

The air purifier 1 may receive the power from the battery 70, in 1140.

For example, the controller 290 may receive the power from the battery 70 without receiving power from the adapter 130. As shown in FIG. 21, the controller 290 may control the power circuit 280 to close (turn on) the second switch 282 and the fifth switch 285 and open (turn off) the first switch 281, the third switch 283 and the fourth switch 284.

Hence, the air purifier 1 may consume only the power produced by the solar cell 60 without consuming power from an external power source while being operated with the first wind volume.

When the measured density of the contaminants is not equal to or less than the reference density (no of 1120), the air purifier 1 may operate with a second wind volume (or second wind velocity) larger than the first wind volume (or first wind velocity), in 1150.

For example, the air purifier 1 may increase the wind volume (or wind velocity) of the purified air the higher the density of the contaminants.

Specifically, the controller 290 may rotate the first motor 52 at the second speed so that the air purifier 1 is operated with the second wind volume (or second wind velocity) larger than the first wind volume based on the measured density of gas being larger than the reference density of gas or the measured density of dust being larger than the reference density of dust. The controller 290 may control the first driving circuit 250 such that the first motor 52 is rotated at the second speed.

The power consumed by the air purifier 2 operated with the second wind volume may be larger than power produced by the solar cell 60. In other words, the air purifier 1 may be operated with the second wind volume by consuming the power charged in the battery 70 and the power produced by the solar cell 60. Hence, when the air purifier 1 is operated with the second wind volume, the charge rate of the battery 70 may decrease.

The air purifier 1 may identify whether the charge rate of the battery 70 is equal to or less than a reference charge rate, in 1160.

For example, the controller 290 may receive an electric signal that represents an input or output current and/or an output voltage of the battery 70 from the battery sensor. The controller 290 may identify the charge rate of the battery 70 based on an input or output current and/or an output voltage of the battery 70. The controller 290 may compare the charge rate of the battery 70 with the reference charge rate.

The reference charge rate may represent a charge rate of the battery 70 with which the air purifier 1 receiving the power from the battery 70 is able to operate with the second wind volume for a reference period. In other words, when the charge rate of the battery 70 is lower than the reference charge rate, the air purifier 1 may be operated with the second wind volume for a shorter period than the reference period. The reference charge rate may be set experimentally or empirically.

In another example, the controller 290 may compare the output voltage of the battery 70 with a reference voltage to identify whether the charge rate of the battery 70 is equal to or less than the reference charge rate. The reference voltage of the battery 70 may correspond to the reference charge rate of the battery 70.

When the charge rate of the battery 70 is not equal to or less than the reference charge rate (no of 1160), the air purifier 1 may receive power from the battery 70, in 1140.

For example, as the air purifier 1 is operated with the second wind volume for more than a reference period, the controller 290 may consume only the power produced by the solar cell 60 without consuming power from an external power source.

When the charge rate of the battery 70 is equal to or less than the reference charge rate (yes of 1160), the air purifier 1 may receive power from the adapter 130, in 1170.

For example, the controller 290 may receive the power from the adapter 130 without receiving power from the battery 70. As shown in FIG. 22, the controller 290 may control the power circuit 280 to close (turn on) the first switch 281 and the fifth switch 285 and open (turn off) the second switch 282, the third switch 283 and the fourth switch 284.

Hence, the air purifier 1 may receive power from an external power source while being operated with the second wind volume, and charge the battery 70 using the power produced by the solar cell 60.

As described above, the air purifier 1 may receive power from the battery 70 charged by the solar cell 60 based on a density of contaminants in the air being lower than the reference density. Furthermore, the air purifier 1 may receive power from the battery 70 charged by the solar cell 60 based on a density of contaminants in the air being equal to or greater than the reference density and a charge rate of the battery 70 is equal to or higher than the reference charge rate.

Hence, the air purifier 1 may reduce consumption of power from the external power source. Also, an increase of electricity bills due to constant use of the air purifier 1 may be prevented or controlled.

Figure 23A:
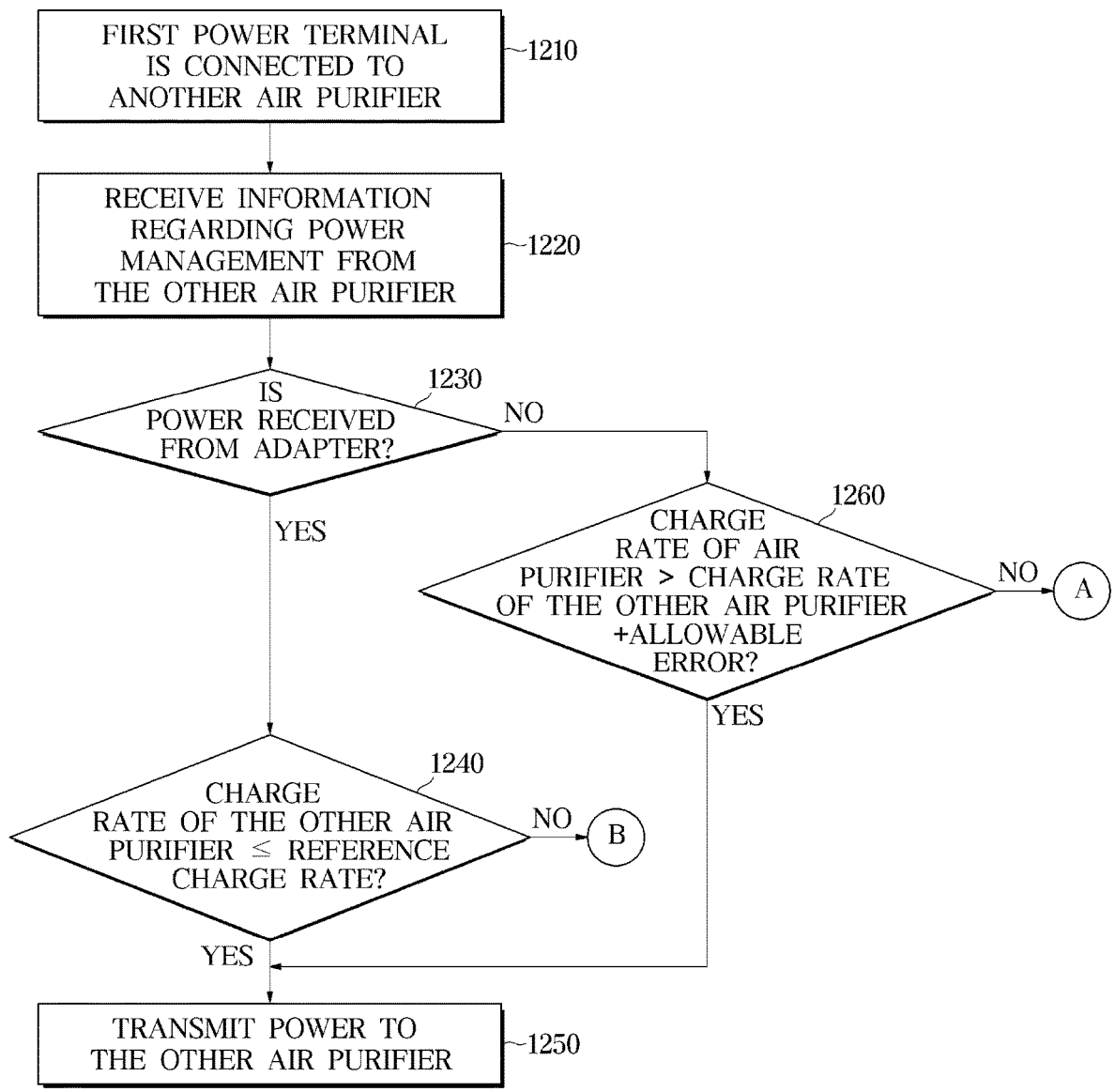
FIGS. 23A and 23B illustrate an operation of an air purifier according to an embodiment.
Figure 23B:
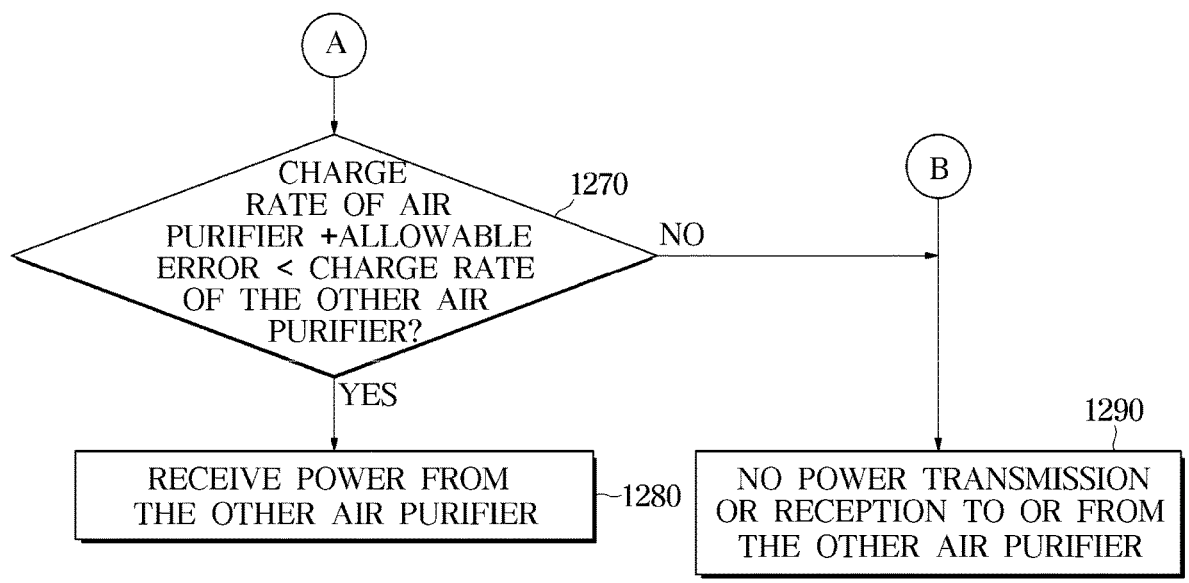
Figure 24:
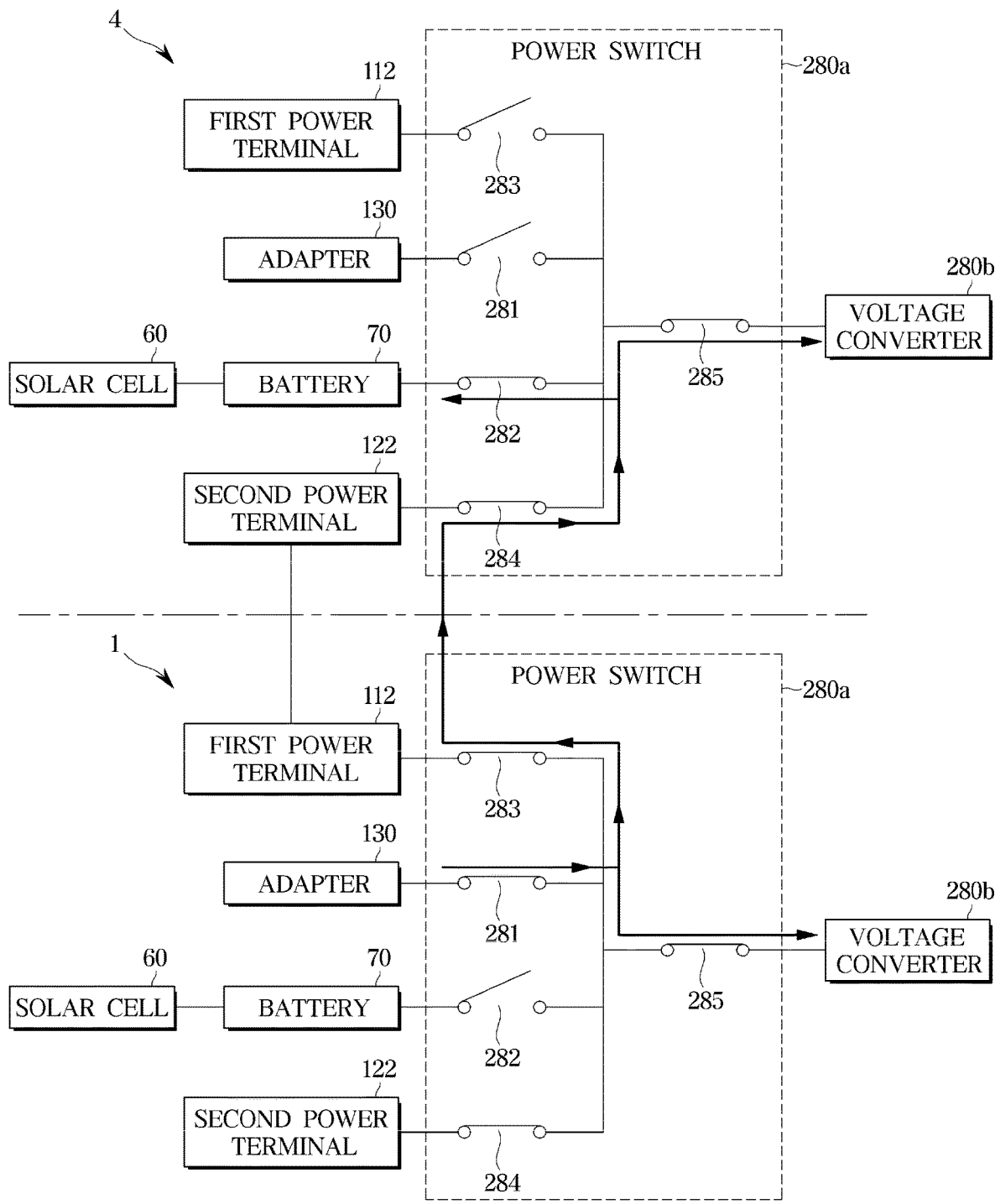
FIG. 24 illustrates an air purifier providing power to another air purifier, according to an embodiment.
Figure 25:
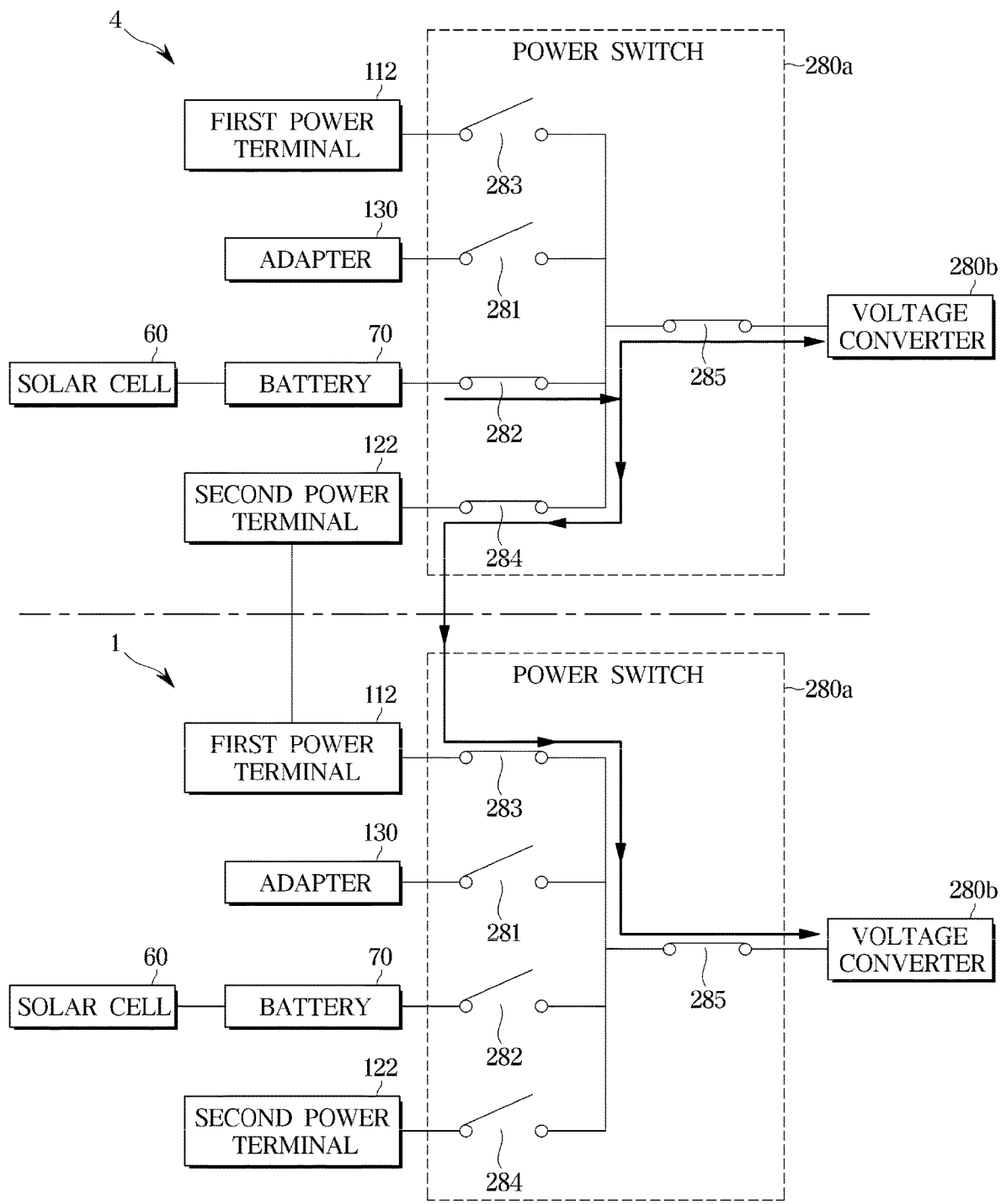
FIG. 25 illustrates an air purifier receiving power from another air purifier, according to an embodiment.

FIGS. 23A and 23B illustrate an operation of an air purifier according to an embodiment. FIG. 24 illustrates an air purifier providing power to another air purifier, according to an embodiment. FIG. 25 illustrates an air purifier receiving power from another air purifier, according to an embodiment.

In connection with FIGS. 23A, 23B, 24 and 25, an operation 1200 in which the air purifier 1 transmits or receives power to or from another air purifier 4 will be described.

The air purifier 1 may identify connection of the first connector 110 to the other air purifier 4, in 1210.

For example, the other air purifier 4 may be placed on the top of the air purifier 1. The first connector 110 of the air purifier 1 may be physically or electrically connected to the second connector 120 of the other air purifier 4. Hence, the first power terminal 112 of the air purifier 1 may be electrically connected to the second power terminal 122 of the other air purifier 4.

The controller 290 of the air purifier 1 may identify that the first connector 110 is connected to anther device based on an output signal of the first terminal sensor 241.

The controller 290 of the air purifier 1 may attempt communication with the other air purifier 4 through the communication module 270. The controller 290 may control the communication module 270 to transmit a discovery signal (e.g., a beacon frame) to identify the other air purifier 4.

The other air purifier 4 may transmit a response signal to the air purifier 1 in response to the discovery signal of the air purifier 1. Based on the response signal of the other air purifier 4, a communication channel may be established between the air purifier 1 and the other air purifier 4.

The controller 290 of the air purifier 1 may identify that the first connector 110 is connected to the other air purifier 4 based on the communication channel being established with the other air purifier 4. In other words, the controller 290 may identify that the first power terminal 112 is connected to the second power terminal 122 of the other air purifier 4.

The air purifier 1 may receive information regarding power management from the other air purifier 4.

For example, the controller 290 of the air purifier 1 may receive the information regarding the power management from the other air purifier 4 through the communication channel with the other air purifier 4. The controller 290 may receive information about a charge rate (or an output voltage) of the battery 70 of the other air purifier 4 from the other air purifier 4.

The controller 290 of the air purifier 1 may identify the charge rate (or the output voltage) of the battery 70 of the other air purifier 4 based on the information received from the other air purifier 4.

The air purifier 1 may identify whether power is received from the adapter 130, in 1230.

For example, the controller 290 of the air purifier 1 may identify whether the air purifier 1 is connected to the adapter 130 or the air purifier 1 receives power from the adapter 130 based on information about connection with the adapter 130.

The air purifier 1 may include a connection detection sensor (or connection detection switch) for identifying whether the adapter 130 is connected to the air purifier 1. The controller 290 may identify whether the air purifier 1 is connected to the adapter 130 based on an output signal of the connection detection sensor.

When the air purifier 1 receives power from the adapter 130 (yes of 1230), the air purifier 1 identifies whether the charge rate of the battery 70 of the other air purifier 4 is equal to or less than a reference charge rate, in 1240.

For example, the controller 290 of the air purifier 1 may identify the charge rate (or the output voltage) of the battery 70 of the other air purifier 4 based on the information regarding power management received from the other air purifier 4.

Furthermore, the controller 290 may compare the charge rate (or output voltage) of the other air purifier 4 with a reference charge rate (or reference voltage). The reference charge rate may represent a charge rate of the battery 70 with which the other air purifier 4 is able to operate with a maximum wind volume for a reference period. The reference charge rate may be set experimentally or empirically.

When the charge rate (or output voltage) of the other air purifier 4 is equal to or less than the reference charge rate (or reference voltage) (yes of 1240), the air purifier 1 may supply power to the other air purifier 4, in 1250.

For example, the controller 290 of the air purifier 1 may control the power circuit 280 to supply power to the other air purifier 4. As shown in FIG. 24, the controller 290 may close (turn on) the first switch 281 to receive power from the adapter 130, and close (turn on) the fifth switch 285 to supply power to the air purifier 1. Furthermore, the controller 290 may close (turn on) the third switch 283 connected to the first power terminal 112 to supply power to the other air purifier 4.

The power received from the adapter 130 may be supplied to the voltage converter 280b of the other air purifier 4 through the first power terminal 112 and the second power terminal 122 of the other air purifier 4. Optionally, the power may be supplied to the battery 70 of the other air purifier 4. Hence, the other air purifier 4 may be operated or may charge the battery 70 with the power received from the air purifier 1.

When the charge rate (or output voltage) of the other air purifier 4 is not equal to or less than the reference charge rate (or reference voltage) (no of 1240), the air purifier 1 may not transmit or receive power to or from the other air purifier 4, in 1290.

For example, when the charge rate of the battery 70 of the other air purifier 4 is higher than the reference charge rate, it may be identified that the other air purifier 4 is able to operate with a maximum wind volume for more than a reference period. To minimize power reception from an external power source, the air purifier 1 may not supply power to the other air purifier 4 from the adapter 130.

Although not shown in the drawings, the air purifier 1 may not supply power to the other air purifier 4 from the adapter 130 when the density of contaminants is lower than the reference density.

When the density of contaminants detected by the contamination sensor 230 of the air purifier 1 is lower than the reference density, it may be identified that the density of the contaminants detected by the other air purifier 4 is also lower than the reference density. Furthermore, the other air purifier 4 may not be operated with the maximum wind volume.

It may be identified that the other air purifier 4 is able to operate for more than a reference period with the power produced by the solar cell 60. Accordingly, to minimize power reception from an external power source, the air purifier 1 may not supply power to the other air purifier 4 from the adapter 130.

When the air purifier 1 does not receive power from the adapter 130 (no of 1230), the air purifier 1 may identify whether a first charge rate of the battery 70 of the air purifier 1 is larger than the sum of a second charge rate of the battery 70 of the other air purifier 4 and an allowable error, in 1260.

For example, the controller 290 of the air purifier 1 may compare the first charge rate of the air purifier 1 with the sum of the second charge rate of the other air purifier 4 and the allowable error. The allowable error may represent an allowable difference between the charge rate of the air purifier 1 and the charge rate of the other air purifier 4. The allowable error may set experimentally or empirically.

When the first charge rate is larger than the sum of the second charge rate and the allowable error (yes of 1260), the air purifier 1 may supply power to the other air purifier 4, in 1250.

For example, the controller 290 of the air purifier 1 may control the power circuit 280 to supply power to the other air purifier 4. The controller 290 may close (turn on) the second switch 282 to receive power from the battery 70, and close (turn on) the third switch 283 connected to the first power terminal 112 to supply power to the other air purifier 4.

The power of the battery 70 included in the air purifier 1 may be supplied to the voltage converter 280b of the other air purifier 4 through the first power terminal 112 and the second power terminal 122 of the other air purifier 4. Hence, the other air purifier 4 may receive power from the air purifier 1. Furthermore, the other air purifier 4 may charge the battery 70 by means of the solar cell 60 while receiving power from the air purifier 1.

Accordingly, an operation time of the other air purifier 4 may increase. Furthermore, a difference between the operation time of the air purifier 1 and the operation time of the other air purifier 4 decreases, and a normal operation time of air purification system for which both the air purifier 1 and the other air purifier 4 are operated may increase.

When the first charge rate is not larger than the sum of the second charge rate and the allowable error (no of 1260), the air purifier 1 may identify whether the second charge rate of the battery 70 of the other air purifier 4 is larger than the sum of the first charge rate of the battery 70 of the air purifier 1 and the allowable error, in 1270.

For example, the controller 290 of the air purifier 1 may compare the second charge rate of the other air purifier 4 with the sum of the first charge rate of the air purifier 1 and the allowable error.

When the second charge rate is larger than the sum of the first charge rate and the allowable error (yes of 1270), the air purifier 1 may receive power from the other air purifier 4, in 1280.

For example, the controller 290 of the air purifier 1 may control the power circuit 280 to receive power from the other air purifier 4. As shown in FIG. 25, the controller 290 may close (turn on) the third switch 283 to receive power through the first power terminal 112, and close (turn on) the fifth switch 285 to supply power to the air purifier 1.

The air purifier 1 may receive power from the other air purifier 4 through the first power terminal 112. Furthermore, the air purifier 1 may charge the battery 70 by means of the solar cell 60 while receiving power from the other air purifier 4.

Accordingly, an operation time of the air purifier 1 may increase. Furthermore, a difference between the operation time of the air purifier 1 and the operation time of the other air purifier 4 decreases, and a normal operation time of air purification system for which both the air purifier 1 and the other air purifier 4 are operated may increase.

When the second charge rate is not larger than the sum of the first charge rate and the allowable error (no of 1270), the air purifier 1 may not transmit or receive power to or from the other air purifier 4, in 1290.

For example, when the difference between the first charge rate of the air purifier 1 and the second charge rate of the other air purifier 4 is smaller than the allowable error, it may be identified that the operation time of the air purifier 1 is almost the same as the operation time of the other air purifier 4. Furthermore, a normal operation time of air purification system for which both the air purifier 1 and the other air purifier 4 are operated may be maximized.

To efficiently consume power, the air purifier 1 may not receive power from the other air purifier 4 nor transmit power to the other air purifier 4.

As described above, the air purifier 1 may control transmission or reception of power between the air purifier 1 and the other air purifier 4 based on a power state of the air purifier 1 and/or a power state of the other air purifier 4.

Hence, the air purifier 1 may supply power to the other air purifier 4, and minimize power reception from an external power source through the adapter 130 to supply the power to the other air purifier 4. Furthermore, the air purifier 1 may maximize a normal operation time of air purification system for which both the air purifier 1 and the other air purifier 4 are operated.

According to an embodiment, an air purifier may include a main body including an inlet and an outlet; a fan arranged in the main body; a solar cell arranged on a first side of the main body; a first light sensor arranged on a second side, which is different from the first side; a second light sensor arranged on a third side, which is different from the first and second sides; a driver arranged to rotate the main body; and a processor configured to control the fan to suck air into the main body through the inlet and discharge the air out of the main body through the outlet. The processor may control the driver to rotate the main body based on an output signal from the first light sensor and an output signal from the second light sensor.

Accordingly, power efficiency of the solar cell may be improved. Furthermore, an amount of power received by the air purifier from an external power source may be reduced.

The processor may rotate the main body so that the first side on which the solar cell is arranged faces a light incidence direction, based on a difference between the output signal of the first light sensor and the output signal of the second light sensor.

The processor may rotate the main body so that the first side is rotated to a direction in which the second side is arranged, based on a magnitude of the output signal of the first light sensor being larger than a magnitude of the output signal of the second light sensor.

By comparison between the magnitude of the output signal of the first light sensor and the magnitude of the output signal of the second light sensor, the light incidence direction may be identified and the solar cell may be forced to face the light incidence direction.

The inlet may be arranged to surround the solar cell.

This may prevent the solar cell from disturbing the flow of air through the inlet.

The air purifier may further include a battery electrically connected to the solar cell, and a power circuit configured to supply power to the fan from one of the battery and an external power source. The processor may control the power circuit to supply power to the fan from one of the battery or the external power source based on a charge rate of the battery.

It may control the power circuit to provide power to the fan from the external power source based on the density of the contaminant based on an output signal of the contamination sensor being larger than a reference density and the charge rate of the battery is less than a reference charge rate.

It may control the power circuit to provide power to the fan from the battery based on the density of the contaminant based on an output signal of the contamination sensor being smaller than the reference density or the charge rate of the battery is larger than the reference charge rate.

Hence, the air purifier may efficiently use the power of the battery without degrading air purification performance.

The air purifier may further include a first connector arranged on the top side of the main body to be connected to a first device, and a second connector arranged on the bottom side of the main body to be connected to a second device.

Hence, the air purifier may be connected to another device (e.g., a light panel, a supporting panel, or another air purifier).

The air purifier may further include a communication module for communicating the first device or the second device. The processor may receive a charge rate of the battery of the first device or the second device through the communication module.

Based on the charge rate of the battery of the first device or the second device, power may be transmitted to the first device or the second device through the first connector or the second connector.

Based on comparison between the charge rate of the battery of the first device or the second device and the charge rate of the batter of the air purifier, power may be transmitted to the first device or the second device or power may be received from the first device or the second device.

Hence, the air purifier may receive power from another device (e.g., a solar panel, a supporting panel, or another air purifier) through a connector or provide power to the other device through the connector. Furthermore, the air purifier may efficiently use power, and reduce an amount of power received from the external power source.

According to the disclosure, an air purifier including a solar cell and a battery, and a method of controlling the air purifier may be provided. Accordingly, an amount of power received by the air purifier from an external power source may be reduced.

According to the disclosure, an air purifier with a solar cell rotationally movable toward the sun, and a method of controlling the air purifier may be provided. Accordingly, efficiency of solar power of the air purifier may be improved.

According to the disclosure, an air purifier for receiving power from one of a battery and an external power source based on a charge rate of the battery, and a method of controlling the air purifier may be provided. Accordingly, efficiency of battery use of the air purifier may be improved.

Meanwhile, the embodiments of the disclosure may be implemented in the form of a recording medium for storing instructions to be carried out by a computer. The instructions may be stored in the form of program codes, and when executed by a processor, may generate program modules to perform operation in the embodiments of the disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

The machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., Playstore™), directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An air purifier comprising:
a main body configured to be rotatable and including an inlet and an outlet;
a fan arranged in the main body and configured to suck air into the main body through the inlet and discharge the air through the outlet;
a solar cell configured to generate power from light received by the solar cell, the solar cell arranged on a first side of the main body, the first side extending along a first plane;
a first light sensor arranged on a second side of the main body and configured to measure an intensity of light received by the first sensor, the second side extending along a second plane, the first plane and the second plane being different from each other;
a second light sensor configured to measure an intensity of light received by the second light sensor, the second light sensor arranged on a third side of the main body, the third side extending along a third plane, the third plane being different from the first plane and the second plane;
a driver configured to rotate the main body; and
a processor configured to:
control the fan to suck air into the main body through the inlet and discharge the air out of the main body through the outlet, and
control the driver to rotate the main body based on an output signal from the first light sensor corresponding to the measured intensity of light received by the first light sensor and an output signal from the second light sensor corresponding to the measured intensity of light received by the second light sensor so that the solar cell is positioned toward a light source.

2. The air purifier of claim 1, further comprising:
a battery electrically connected to the solar cell, and
a power circuit configured to supply power to the fan from one of the battery and an external power source,
wherein the processor is configured to control the power circuit to supply power to the fan from one of the battery or the external power source based on a charge rate of the battery.

3. A method of controlling an air purifier, the method comprising:
sucking air into a main body through an inlet arranged at the main body;
discharging air out of the main body through an outlet arranged at the main body;
generating power using a solar cell arranged on a first side of the main body, the first side extending along a first plane; and
rotating the main body so that the solar cell is positioned toward a light source, based on
an output signal of a first light sensor, the output signal corresponding to an intensity of light received by the first light sensor, the first light sensor arranged on a second side of the main body, the second side extending along a second plane, the first plane being different from the second plane, and
an output signal of a second light sensor, the output signal of the second light sensor corresponding to an intensity of light received by the second light sensor, the second light sensor arranged on a third side of the main body, the third side extending along a third plane, the third plane being different from the first plane and second plane.

* * * * *

UNITED STATES PATENT AND TRADEMARK OFFICE
CERTIFICATE OF CORRECTION

PATENT NO. : 12,331,957 B2
APPLICATION NO. : 17/575763
DATED : June 17, 2025
INVENTOR(S) : Sejin Jo et al.

Page 1 of 1

It is certified that error appears in the above-identified patent and that said Letters Patent is hereby corrected as shown below:

On the Title Page

Item (63), Column 1, Line 3, Below "PCT/KR2021/019551, filed on Dec. 22, 2021." insert Item (30)
-- (30) Foreign Application Priority Data Mar. 16, 2021 (KR) ...... 10-2021-0034229 --.

Signed and Sealed this
Twenty-eighth Day of October, 2025

John A. Squires
*Director of the United States Patent and Trademark Office*